United States Patent [19]
Draper et al.

[11] Patent Number: 5,878,434
[45] Date of Patent: Mar. 2, 1999

[54] TRANSACTION CLASH MANAGEMENT IN A DISCONNECTABLE COMPUTER AND NETWORK

[75] Inventors: Stephen P. W. Draper, Basingstoke; Brian J. Collins, New Malden; Patrick T. Falls, Newbury, all of England

[73] Assignee: Novell, Inc, Provo, Utah

[21] Appl. No.: 700,489

[22] PCT Filed: Jul. 18, 1996

[86] PCT No.: PCT/US96/11902

§ 371 Date: May 27, 1997

§ 102(e) Date: May 27, 1997

[87] PCT Pub. No.: WO97/04390

PCT Pub. Date: Feb. 6, 1997

[51] Int. Cl.[6] .................................................. G06F 17/00
[52] U.S. Cl. ........................... 707/202; 201/203; 201/204
[58] Field of Search ............ 707/1–206; 395/180–185.1, 395/701, 710; 370/268–349

[56] References Cited

U.S. PATENT DOCUMENTS

| | | | |
|---|---|---|---|
| 4,575,793 | 3/1986 | Morel et al. | 364/200 |
| 4,622,631 | 11/1986 | Frank et al. | 364/200 |
| 4,774,655 | 9/1988 | Kollin et al. | 364/200 |
| 4,774,661 | 9/1988 | Kumpati | 364/300 |
| 4,827,399 | 5/1989 | Shibayama | 364/200 |
| 4,878,167 | 10/1989 | Kapulka et al. | 364/200 |
| 4,941,845 | 7/1990 | Eppley et al. | 439/505 |
| 4,979,168 | 12/1990 | Courtois | 370/349 |
| 5,001,628 | 3/1991 | Johnson et al. | 364/200 |
| 5,008,814 | 4/1991 | Mathur | 364/200 |
| 5,019,963 | 5/1991 | Alderson et al. | 364/200 |
| 5,043,876 | 8/1991 | Terry | 364/200 |
| 5,113,519 | 5/1992 | Johnson et al. | 395/600 |
| 5,142,680 | 8/1992 | Ottman et al. | 395/700 |
| 5,146,561 | 9/1992 | Carey et al. | 395/200 |
| 5,151,989 | 9/1992 | Johnson et al. | 395/600 |
| 5,155,847 | 10/1992 | Kirouac et al. | 395/600 |
| 5,159,669 | 10/1992 | Trigg et al. | 395/159 |
| 5,170,480 | 12/1992 | Mohan et al. | 395/600 |
| 5,185,857 | 2/1993 | Rozmanith et al. | 395/148 |
| 5,212,789 | 5/1993 | Rago | 395/600 |
| 5,229,768 | 7/1993 | Thomas | 341/51 |
| 5,237,680 | 8/1993 | Adams et al. | 395/600 |
| 5,247,683 | 9/1993 | Holmes et al. | 395/700 |
| 5,274,803 | 12/1993 | Dubin et al. | 395/600 |
| 5,276,868 | 1/1994 | Poole | 395/600 |
| 5,276,871 | 1/1994 | Howarth | 395/600 |
| 5,276,876 | 1/1994 | Coleman et al. | 395/650 |
| 5,278,979 | 1/1994 | Foster et al. | 395/600 |

(List continued on next page.)

FOREIGN PATENT DOCUMENTS

| | | | |
|---|---|---|---|
| 87107475.3 | 1/1988 | European Pat. Off. | G06F 11/14 |
| 92308720.9 | 8/1993 | European Pat. Off. | G06F 15/16 |
| 95100255.9 | 7/1995 | European Pat. Off. | G06F 17/30 |
| 9508809 | 3/1995 | WIPO | G06F 17/30 |

OTHER PUBLICATIONS

Advance Program—Second Workshop on the Management of Replicated Data (WMRD–II), Nov. 12–13, 1992, pp. 1–2.

"Application–Aware Adaptation for Mobile Computing", M. Satyanarayanan et al., *ACM SIGOS Operating Systems Review* 29.1, 1995, pp. 52–55.

(List continued on next page.)

*Primary Examiner*—Maria N. Von Buhr
*Assistant Examiner*—David Kirk Jung
*Attorney, Agent, or Firm*—Computer Law++

[57] ABSTRACT

A method and apparatus are disclosed for detecting and handling clashes that may occur when transactions performed on disconnected replicas of a database are merged after the computers carrying the replicas are reconnected. A variety of clashes are addressed, including those which arise from inconsistent add, remove, move, and modify operations. Transient clashes that would resolve themselves without significant intervention are distinguished from persistent clashes. Log patching, regression, key modification, duplication, and a variety of other tools for handling the clashes are described.

51 Claims, 4 Drawing Sheets

U.S. PATENT DOCUMENTS

| | | | |
|---|---|---|---|
| 5,278,982 | 1/1994 | Daniels et al. | 395/600 |
| 5,291,591 | 3/1994 | Kawano et al. | 395/600 |
| 5,297,278 | 3/1994 | Wang et al. | 395/600 |
| 5,313,646 | 5/1994 | Hendricks et al. | 395/600 |
| 5,317,728 | 5/1994 | Tevis et al. | 395/600 |
| 5,321,832 | 6/1994 | Tanaka et al. | 395/600 |
| 5,325,524 | 6/1994 | Black et al. | 395/600 |
| 5,333,315 | 7/1994 | Saether et al. | 395/600 |
| 5,347,653 | 9/1994 | Flynn et al. | 395/600 |
| 5,355,476 | 10/1994 | Fukumara | 395/600 |
| 5,375,207 | 12/1994 | Blakely et al. | 395/200 |
| 5,377,326 | 12/1994 | Murata et al. | 395/200 |
| 5,379,280 | 1/1995 | Cotton et al. . | |
| 5,388,256 | 2/1995 | Herbert | 395/600 |
| 5,390,335 | 2/1995 | Stephan et al. | 395/800 |
| 5,403,639 | 4/1995 | Belsan et al. | 395/600 |
| 5,408,619 | 4/1995 | Oran | 395/325 |
| 5,410,543 | 4/1995 | Seitz et al. | 370/85.13 |
| 5,410,684 | 4/1995 | Ainsworth et al. | 395/575 |
| 5,412,801 | 5/1995 | de Remer et al. | 395/575 |
| 5,418,957 | 5/1995 | Narayan | 395/700 |
| 5,423,034 | 6/1995 | Cohen-Levy et al. | 395/600 |
| 5,430,871 | 7/1995 | Jamoussi et al. | 395/600 |
| 5,434,994 | 7/1995 | Shaheen et al. | 395/500 |
| 5,452,450 | 9/1995 | Delory | 395/600 |
| 5,737,609 | 4/1998 | Reed et al. | 395/704 |

OTHER PUBLICATIONS

"Architecture of the Fiscus Scalable Replicated File System", T. Page, Jr., *Computer Science Department Technical Report University of California At Los Angeles*, Mar. 1991, pp. 1–18.

"Coda: A Highly Available file System for a Distributed Workstation Environment", M. Satyanarayanan et al., *IEEE Transactions On Computers*, vol. 39 No. 4 Apr. 1990, pp. 447–459.

"Coding for Compression in Full–Text Retrieval Systems", A. Moffat et al., *IEEE DCC Data Compression Conference*, 1992, pp. 72–81.

"A compact representation for file versions: a preliminary report", A. Black et al., *5th IEEE Conference On Data Engineering*, 1989, pp. 321–329.

"Concurrency Control and Consistency of Multiple Copies of Data in Distributed INGRES ", M. Stonebraker, *IEEE Transactions On Software Engineering*,vol. SE–5, No. 3, May 1979, pp. 188–194

"Conflict Detection Tradeoffs for Replicated Data", M. Carey et al., *ACM Transactions on Database System*, vol. 16, No. 4, Dec. 1991., pp. 703–746.

"Countdown to Mobile Blast–Off", I. Brodsky, *Network World*, Feb. 19, 1996, pp. 44–46,52.

"Data Managemant for Mobile Computing", T. Imielinski et al., *ACM SIGMOD Record*, vol. 22, No. 1, Mar. 1993, pp. 34–39.

"Data Replicas in Distributed Information Services", H. Gladney, *ACM Transactions on Database Systems*, vol. 14, No. 1., Mar. 1989, pp. 75–97.

"Database System Issues in Nomadic Computing", R. Alonso et al., *ACM SIGMOD Record*, 22 2, 1993, pp. 388–392.

"DGDBM: Programming Support for Distributed Transactions Over Replicated Files", M. Franky, *ACM SIGOS Operating Systems Review*, 29 3, Jul. 1995, pp. 64–74.

"Disconnected Operation for AFS", L. Huston et al., Mobile and Location–Independent Computing Symposium, USENIX Association, 1994, pp. 1–10.

"Disconnected Operation in the Coda File Syatem", J. Kistler et al., *ACM Operating Systems Review*, 25 5, 1991, pp. 213–225.

"Disconnected Operation in a Distributed File System", J. Kistler, *Ph.D. thesis, Department of Computer Science, Carnegie Mellon University*, May 1993, pp. 1–186.

"Discord in hardwareland", T. Schmidt, *Network World*, Feb. 19, 1996, p. 47.

"Distributed Logging for Transaction Processing", D. Daniels et al., *ACM*, 1987, pp. 82–96.

"Experience with Disconnected Operation in a Mobile Computing Environment", M. Satyanarayanan et al., *Mobile and Location–Independent Computing Symposium*, 1994, pp. 11–28.

"Fixed Length Semiorder Preserving Code for Field Level Data File Compression", M. Toyama et al., *IEEE–First International Conference on Data Engineering*, 1984, pp. 244–252.

"Flexible and Safe Resolution of File Conflicts", P. Kumar et al., 1995 *UESNIX Technical Conference*, Jan. 16–20, 1995, pp. 95–106.

"The Generalized Tree Quorum Protocol: An Efficient Approach for Managing Replicated Data", D. Agrawal et al., *ACM Transactions on Database Systems*, vol. 17, No. 4, Dec. 1992, pp. 689–717.

"A Generic Multicast Transport Service to Support Disconnected Operation", S. Maffeis et al., *Mobile and Location-–Independent Computing Symposium*, 1995, pp. 79–80.

"Getting Your Byte's Worth", S. Vaughan–Nichols, *Byte*, Nov. 1990, pp. 331–336.

"Grapevine: An Exercise in Distributed Computing–Abstract", A. Birrell et al., *Communications of the ACM*, vol. 25, No. 4, Apr. 1982, pp. 260–261.

"Going Mobile", S. Biagi, *Network Var*, Apr. 1996, p. 14.

"Impact of Mobility on Distributed Comptations", B. Badrinath et al., *ACM SIGOS Operating Systems Review*, 27 2, 1993, pp. 15–20.

"An Introduction to Database Systems vol. II", C. Date, *Addison–Wesley Publidhing Company*, 1993, pp. 1–33, 291–340.

"Isolation–Only Transactions for Mobile Computing", Q. Lu et al., *ACM SOGOS Operating Systems Review*, 28 2, 1994, pp. 81–87.

"Log–Based Directory Resolution in the Coda File System", P. Kumar et al., *IEEE*, 1993, pp. 202–213.

"The Lotus Notes™ Storage System", K. Moore, *ACM SIGMOD Record*, 24 2, 1995, pp. 427–428.

"Low Cost Management of Replicated Data in Fault–Tolerant Distributed Systems", T. Joseph et al., *ACM Transactions on Computer Systems*, vol. 4, No. 1, Feb. 1986, pp. 54–70.

"Maintaining Availability in Partitioned Replicated Databases", A. Abbadi et al., *ACM Transactions on Computer Systems*, vol. 14, No. 2, Jun. 1989, pp. 264–290.

"Model Based Concordance Compression", A. Bookstein et al., *IEEE DCC Data Compression Conference*, 1992, pp. 82–91.

"The Multicast Policy and Its Relationship to Replicated Data Placement", O. Wolfson et al., *ACM Transactions on Database Systems*, vol. 16, No. 1, Mar. 1991, pp. 181–205.

"A Multi–Group Technique for Data Compression", K. Hazboun et al., *ACM SIGMOD Conference*, 1982, pp. 284–292.

"NetWare 4 for Professionals", D. Bierer et al., *New Riders Publishing*, 1993, pp. 359–374.

"A Non–Blocking Transaction Data Flow Graph Based Approach For Replicated Data", P. Krishna Reddy et al., *Operating Systems Review (SIGOPS)* 27 No. 3, Jul. 1993, pp. 46–54.

"Partially Connected Operation", L. Huston et al., *Mobile and Location–Independent Computing Symposium,* 1995, pp. 91–97.

"Peephole Log Optimization", L. Huston et al., *IEEE Workshop on Mobile Computing Systems and Applications,* Dec. 1994, pp. 1–8.

"Performing Remote Operations Efficiently on a Local Computer Network", A. Spector, *Communications of the ACM,* vol. 25, No. 4, Apr. 1982, pp. 246–259.

"Primarily Disconnected Operation: Experiences with Ficus", J. Heidemann et al., *IEEE,* 1992, pp. 2–5.

"Replicated Data in a Distributed Environment", M. Colton, *ACM SIGMOD Record,* 22 2, 1993, pp. 464–466.

"Remote access can't slow down", H. Allard, *Network World,* Feb. 19, 1996, p. 53.

"A Replicated UNIX File System (Extended Abstract)", B. Liskov et al., *ACM SIGOS Operating Systems Review,* 25 1, 1991, pp. 60–64.

"Replication in the Harp File System", B. Liskov, *ACM Operating Systems Review,* 25 5, 1991, pp. 226–238.

"Resolving File Conflicts In The Ficus File System", P. Reiher et al., 1994 *Summer Usenix,* Jun. 6–10, 1994, pp. 183–195.

"RFS Architectural Overview", A. Rifkin et al., Jun. 1986, pp. 248–259.

"Scalable, Secure, and Highly Available Distributed File Access", M. Satyanarayanan, *Computer* 23 No. 5, May 1990, pp. 9–20.

"A Snapshot Differential Refresh Algorithm", B. Lindsay et al., *ACM SIGMOD Record,* 15 2, 1986, pp. 53–60.

"Software spins wheels in niche markets", K. Scherberger, *Network World,* Feb. 19, 1996, p. 49.

Space and Time Savings Through Large Data Base Compression and Dynamic Restructuring, P. Alsberg, *Proceedings of the IEEE,* vol. 63, No. 8, Aug. 1975, pp. 1114–1122.

"Sun–3 Architecture" Anon., Aug. 1986, pp. 8–9, 49–57.

"Supporting Application–Specific Resolution in an Optimistically Replicated File System", P. Kumar et al., *IEEE,* 1993, pp. 66–70.

"System Isolation and Network Fast–Fail Capability in Solaris", G. Montenegro et al., *Mobile and Location–Independent Computing Symposium,* 1995, pp. 67–78.

"Transaction Support in a Log–Structured File System", M. Seltzer, *IEEE–Ninth International Conference on Data Engineering,* 1993, pp. 503–510.

"The Transparent Remote File System", R. Hughes, Date Unknown.

"Two Levels of Filesystem Hierarchy on One Disk", V. Cate, *Department of Computer Science, Carnegie Mellon University,* May 1990, pp. 1–20.

"Using Prospero to Support Integrated Location–Independent Computing", B. Neuman et al., *Mobile and Location––Independent Computing Symposium,* 1994, pp. 29–34.

"Wireless IR lets mobile devices get personal", (partial article), J. Edney, *Electronic Engineering Times,* Feb. 19, 1996, p. 44.

"Wireless LANs roaming for standards" (partial article), unknown, *Electronic Engineering Times,* Feb. 19, 1996, p. 65.

"Wireless nets come of age", I. Gillott, *Network World,* Feb. 19, 1996, pp. 50, 52.

Summary of Fitler et al. Invention, 1992.

Mobile NetWare Lite Specification, Version 1.0, Aug. 20, 1992 (best available copy).

TRANSACTION CLASH MANAGEMENT IN A DISCONNECTABLE COMPUTER AND NETWORK

FIELD OF THE INVENTION

The present invention relates to the detection and resolution of inconsistent updates performed on disconnected computers, and more particularly, to clash handling during transaction synchronization when disconnectable computers are reconnected.

TECHNICAL BACKGROUND OF THE INVENTION

"Disconnectable" computers are connected to one another only sporadically or at intervals. Familiar examples include "mobile-link" portable computers which are connectable to a computer network by a wireless links and separate server computers in a wide-area network (WAN) or other network. Disconnectable computers can be operated either while connected to one another or while disconnected. During disconnected operation, each computer has its own copy of selected files (or other structures) that may be needed by a user. Use of the selected items may be either direct, as with a document to be edited, or indirect, as with icon files to be displayed in a user interface.

Unfortunately, certain operations performed on the selected item copies may not be compatible or consistent with one another. For instance, one user may modify a file on one computer and another user may delete the "same" file from the other computer. A "synchronization" process may be performed after the computers are reconnected. At a minimum, synchronization attempts to propagate operations performed on one computer to the other computer so that copies of items are consistent with one another.

During synchronization, some disconnectable computers also attempt to detect inconsistencies and to automatically resolve them. These attempts have met with limited success.

For instance, the Coda File System ("Coda") is a client-server system that provides limited support for disconnectable operation. To prepare for disconnection, a user may hoard data in a client cache by providing a prioritized list of files. On disconnection, two copies of each cached file exist: the original stored on the server, and a duplicate stored in the disconnected client's cache. The user may alter the duplicate file, making it inconsistent with the server copy. Upon reconnection, this inconsistency may be detected by comparing timestamps.

However, the inconsistency is detected only if an attempt is made to access one of the copies of the file. The Coda system also assumes that the version stored in the client's cache is the correct version, so situations in which both the original and the duplicate were altered are not properly handled. Moreover, Coda is specifically tailored, not merely to file systems, but to a particular file system (a descendant of the Andrew File System). Coda provides no solution to the more general problem of detecting and resolving inconsistencies in a distributed database that can include objects other than file and directory descriptors.

Various approaches to distributed database replication attempt to ensure consistency between widely separated replicas that collectively form the database. Examples include, without limitation, the replication subsystem in Lotus Notes and the partition synchronization subsystem in Novell NetWare® 4.1 (LOTUS NOTES is a trademark of International Business Machines, Inc. and NETWARE is a registered trademark of Novell, Inc.).

However, some of these approaches to replication are not transactional. Non-transactional approaches may allow partially completed update operations to create inconsistent internal states in network nodes. Non-transactional approaches may also require a synchronization time period that depends directly on the total number of files, directories, or other objects in the replica. This seriously degrades the performance of such approaches when the network connection used for synchronization is relatively slow, as many modem or WAN links are.

Moreover, in some conventional approaches potentially conflicting changes to a given set of data are handled by simply applying the most recent change and discarding the others. In other conventional systems, users must resolve conflicts with little or no assistance from the system. This can be both tedious and error-prone.

Thus, it would be an advancement in the art to provide a system and method for detecting and handling inconsistent changes to copied items when two disconnectable computers are reconnected.

It would also be an advancement to provide such a system and method which are not limited to file system operations but can instead be extended to support a variety of database objects.

Such a system and method are disclosed and claimed herein.

BRIEF SUMMARY OF THE INVENTION

The present invention provides a system and method for handling clashes during the synchronization of operations performed on first and second disconnected computers. Each disconnected computer contains a replica of a distributed database. In one embodiment, the first computer is a mobile client computer and the second computer is a central server computer; in another embodiment, each computer is a server on a network.

Synchronization of the database replicas is performed after the computers are reconnected. Synchronization includes a "merging out" step, a "merging in" step, and one or more clash handling steps. During the merging out step, operations performed on the first computer are transmitted to the second computer and applied to the second replica. During the merging in step, operations performed on the second computer are transmitted to the first computer and applied to the first replica.

Some of the clash handling steps detect transient or persistent clashes, while other steps recover from at least some of those clashes. Persistent clashes may occur in the form of unique key clashes, incompatible manipulation clashes, file content clashes, permission clashes, or clashes between the distributed database and an external structure. Recovery may involve insertion of an update before or after a clashing update, alteration of the order in which updates occur, consolidation of two updates into one update, and/or creation of a recovery item.

In one embodiment of the present invention, operations performed on each computer are represented by entries in an update log kept on each computer. During recovery, the log may be accessed to help regress persistently clashing updates from the computer's replica. Clash detection, recovery, and regression are performed recursively after an update regression to handle clashes caused by the update regression. Log management steps permit the identification of clashing updates in a log, the removal of a clash condition by use of a repairing update, and compression of the update log.

Transaction synchronization and log compression are further described in commonly owned copending applications entitled TRANSACTION SYNCHRONIZATION IN A DISCONNECTABLE COMPUTER AND NETWORK and TRANSACTION LOG MANAGEMENT IN A DISCONNECTABLE COMPUTER AND NETWORK, filed the same day and having the same inventors as the present application.

The features and advantages of the present invention will become more fully apparent through the following description and appended claims taken in conjunction with the accompanying drawings.

BRIEF DESCRIPTION OF THE DRAWINGS

To illustrate the manner in which the advantages and features of the invention are obtained, a more particular description of the invention summarized above will be rendered by reference to the appended drawings. Understanding that these drawings only provide selected embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Figure 1:
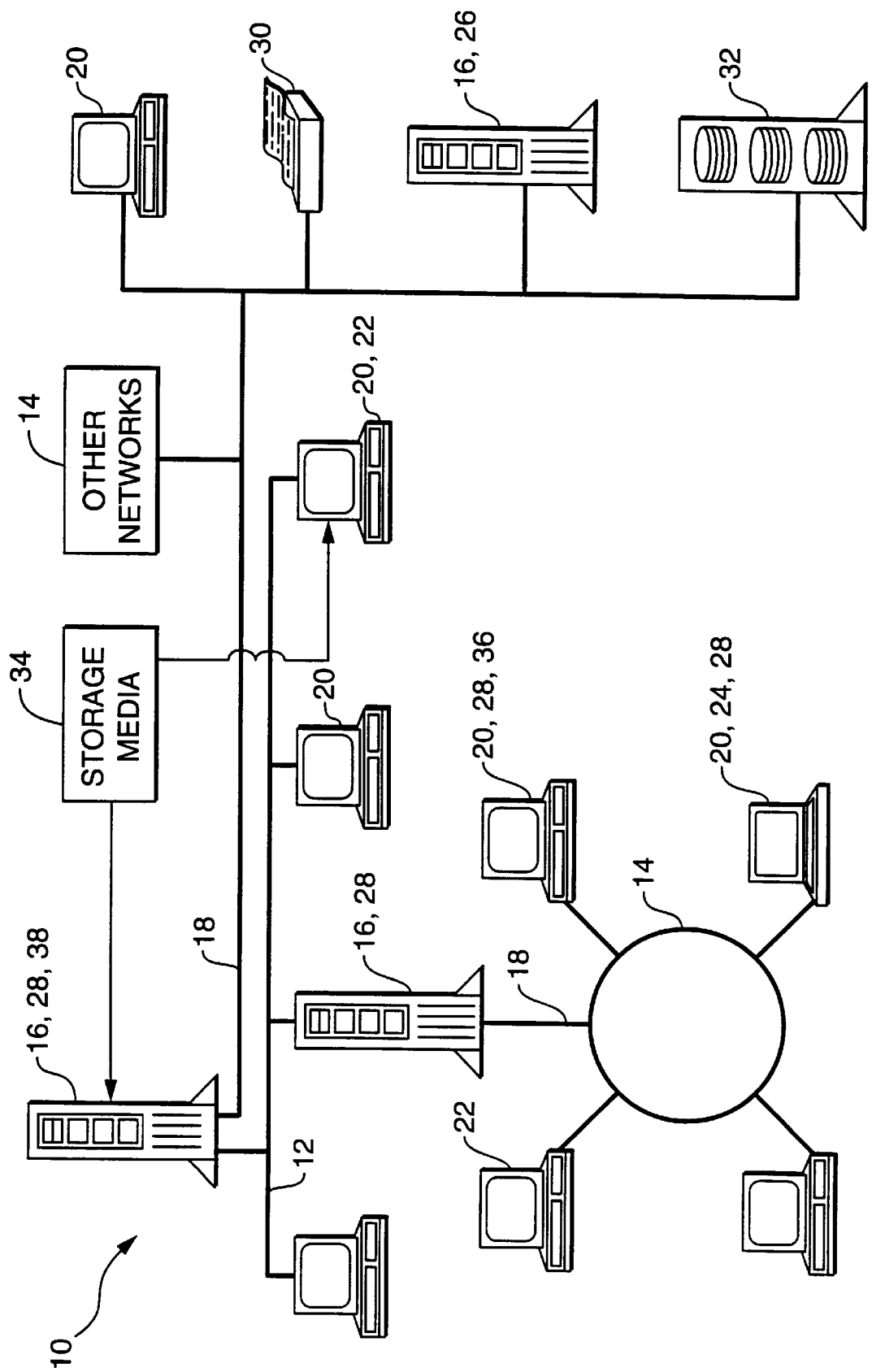
FIG. 1 is a schematic illustration of a computer network suitable for use with the present invention.

Reference is now made to the Figures wherein like parts are referred to by like numerals. The present invention relates to a system and method which facilitate disconnected computing with a computer network. One of the many computer networks suited for use with the present invention is indicated generally at 10 in FIG. 1.

In one embodiment, the network 10 includes Novell NetWare® network operating system software, version 4.x (NETWARE is a registered trademark of Novell, Inc.). In alternative embodiments, the network includes Personal NetWare, NetWare Mobile, VINES, Windows NT, LAN Manager, or LANtastic network operating system software (VINES is a trademark of Banyan Systems; NT and LAN Manager are trademarks of Microsoft Corporation; LANtastic is a trademark of Artisoft). The network 10 may include a local area network 12 which is connectable to other networks 14, including other LANs, wide area networks, or portions of the Internet, through a gateway or similar mechanism.

The network 10 includes several servers 16 that are connected by network signal lines 18 to one or more network clients 20. The servers 16 may be file servers, print servers, database servers, Novell Directory Services servers, or a combination thereof. The servers 16 and the network clients 20 may be configured by those of skill in the art in a wide variety of ways to operate according to the present invention.

The network clients 20 include personal computers 22, laptops 24, and workstations 26. The servers 16 and the network clients 20 are collectively denoted herein as computers 28. Suitable computers 28 also include palmtops, notebooks, personal digital assistants, desktop, tower, micro-, mini-, and mainframe computers. The signal lines 18 may include twisted pair, coaxial, or optical fiber cables, telephone lines, satellites, microwave relays, modulated AC power lines, and other data transmission means known to those of skill in the art.

In addition to the computers 28, a printer 30 and an array of disks 32 are also attached to the illustrated network 10. Although particular individual and network computer systems and components are shown, those of skill in the art will appreciate that the present invention also works with a variety of other networks and computers.

At least some of the computers 28 are capable of using floppy drives, tape drives, optical drives or other means to read a storage medium 34. A suitable storage medium 34 includes a magnetic, optical, or other computer-readable storage device having a specific physical substrate configuration. Suitable storage devices include floppy disks, hard disks, tape, CD-ROMs, PROMs, RAM, and other computer system storage devices. The substrate configuration represents data and instructions which cause the computer system to operate in a specific and predefined manner as described herein. Thus, the medium 34 tangibly embodies a program, functions, and/or instructions that are executable by at least two of the computers 28 to perform clash handling steps of the present invention substantially as described herein.

Figure 2:
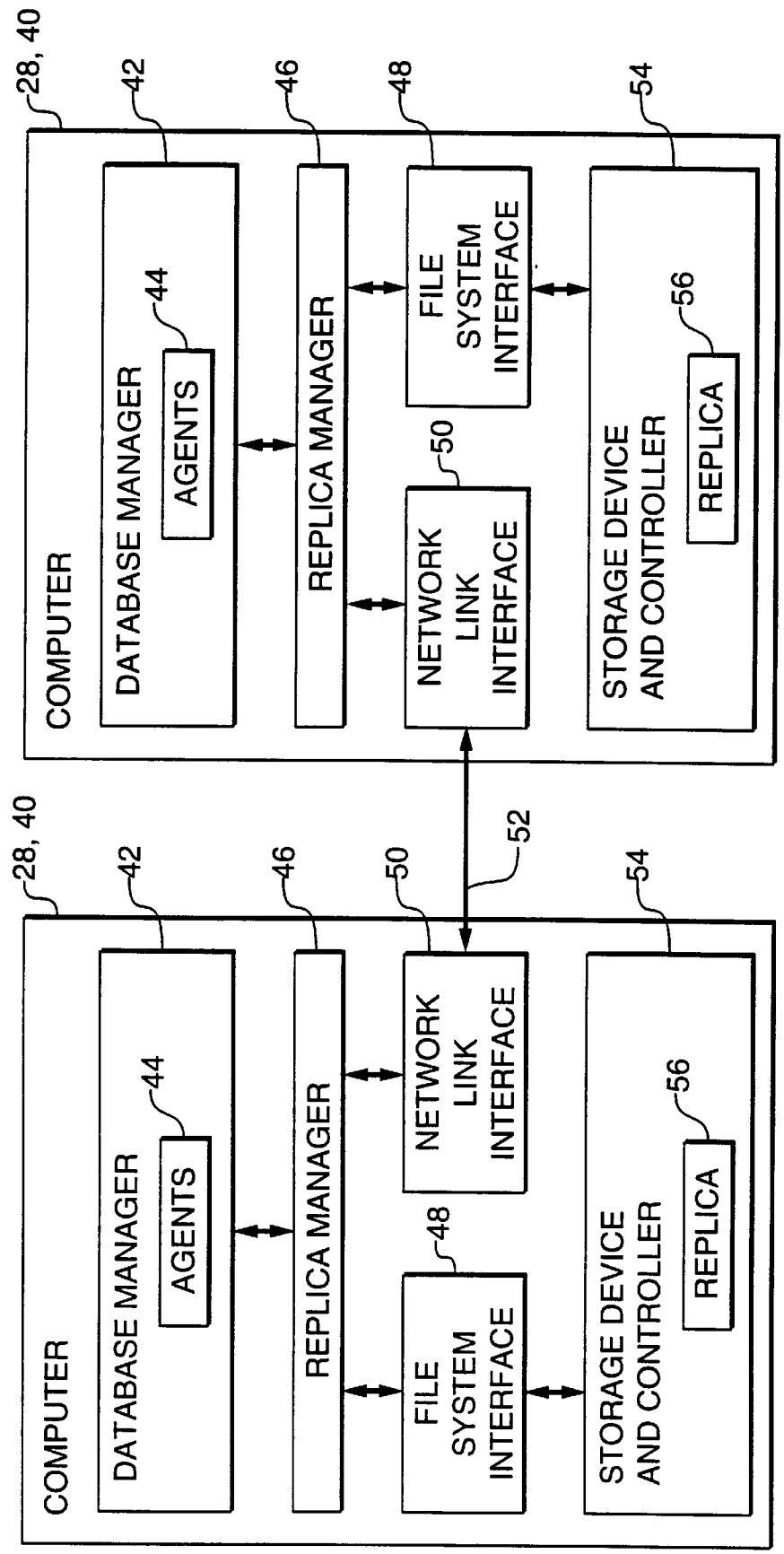
FIG. 2 is a diagram illustrating two computers in a network, each configured with a database manager, replica manager, network link manager, and other components according to the present invention.

With reference to FIG. 2, at least two of the computers 28 are disconnectable computers 40 configured according to the present invention. Each disconnectable computer 40 includes a database manager 42 which provides a location-independent interface to a distributed hierarchical target database embodied in convergently consistent replicas 56. Suitable databases include Novell directory services databases supported by NetWare 4.x.

A database is a collection of related objects. Each object has associated attributes, and each attribute assumes one or more values at any given time. Special values are used internally to represent NULL, NIL, EMPTY, UNKNOWN, and similar values. Each object is identified by at least one "key." Some keys are "global" in that they are normally unique within the entire database; other keys are "local" and are unique only within a proper subset of the database. A database is "hierarchical" if the objects are related by their relative position in a hierarchy, such as a file system hierarchy. Hierarchies are often represented by tree structures.

The target database includes file descriptor objects, directory descriptor objects, directory services objects, printer job objects, or other objects. The target database is distributed in that entries are kept in the replicas 56 on different computers 40. Each replica 56 in the target database contains at least some of the same variables or records as the other replicas 56. The values stored in different replicas 56 for a given attribute are called "corresponding values." In general, corresponding values will be equal.

However, replicas 56 at different locations (namely, on separate computers 40) may temporarily contain different values for the same variable or record. Such inconsistencies are temporary because changes in value are propagated throughout the replicas 56 by the invention. Thus, if the changes to a particular variable or record are infrequent relative to the propagation delay, then all replicas 56 will converge until they contain the same value for that variable or record.

More generally, the present invention provides a basis for a family of distributed software applications utilizing the target database by providing capabilities which support replication, distribution, and disconnectability. In one embodiment, the database manager 42 includes one or more agents 44, such as a File Agent, a Queue Agent, or a Hierarchy Agent. The database manager 42 hides the complexity of distribution of data from the application programs. Distributed programs make requests of the database manager 42, which dispatches each request to an appropriate agent 44.

Each agent 44 embodies semantic knowledge of an aspect or set of objects in the distributed target database. Under this modular approach, new agents 44 can be added to support new distributed services. For instance, assumptions and optimizations based on the semantics of the hierarchy of the NetWare File System are embedded in a Hierarchy Agent, while corresponding information about file semantics are embedded in a File Agent. In one embodiment, such semantic information is captured in files defining a schema 84 (FIG. 3) for use by agents 44.

The schema 84 includes a set of "attribute syntax" definitions, a set of "attribute" definitions, and a set of "object class" (also known as "class") definitions. Each attribute syntax in the schema 84 is specified by an attribute syntax name and the kind and/or range of values that can be assigned to attributes of the given attribute syntax type. Attribute syntaxes thus correspond roughly to data types such as integer, float, string, or Boolean in conventional programming languages.

Each attribute in the schema 84 has certain information associated with it. Each attribute has an attribute name and an attribute syntax type. The attribute name identifies the attribute, while the attribute syntax limits the values that are assumed by the attribute.

Each object class in the schema 84 also has certain information associated with it. Each class has a name which identifies this class, a set of super classes that identifies the other classes from which this class inherits attributes, and a set of containment classes that identifies the classes permitted to contain instances of this class.

An object is an instance of an object class. The target database contains objects that are defined according to the schema 84 and the particulars of the network 10. Some of these objects may represent resources of the network 10. The target database is a "hierarchical" database because the objects in the database are connected in a hierarchical tree structure. Objects in the tree that can contain other objects are called "container objects" and must be instances of a container object class.

A specific schema for the Hierarchy Agent will now be described; other agents may be defined similarly. The ndr_dodb_server class is the top level of the HA-specific database hierarchy. Since a database may contain many servers, the name is treated as a unique key for HA servers within a database.

```
CLASS          ha_server
{
    SUPERCLASS  ndr_dodb_object_header;
    PARENT      ndr_dodb_database;
    PROPERTY    NDR_OS_CLASS_FLAG_FULLY_REPLICATED;
    ATTRIBUTE
    {
        ha_server_name  server_name
        PROPERTY        NDR_OS_ATTR_FLAG_SIBLING_KEY;
    }
}
CONSTANT  HA_VOLUME_NAME_MAX=32;
DATATYPE  ha_volume_name    STRING HA_VOLUME_NAME_MAX;
DATATYPE  ha_volume_id      BYTE;
    A volume has a name, which must be unique within the
server and can be used as the root component of a path name:
CLASS          ha_volume
{
    SUPERCLASS  ndr_dodb_object_header;
    PARENT      ha_server;
    PROPERTY    NDR_OS_CLASS_FLAG_NAMESPACE_ROOT;
    ATTRIBUTE
    {
        ha_volume_name      volume_name
        PROPERTY            NDR_OS_ATTR_FLAG_SIBLING_KEY |
                            NDR_OS_ATTR_FLAG_IS_DOS_FILENAME;
        ha_volume_id        volume_id;
    }
}
```

In order to allocate unique volume identifiers this object holds the next free volume ID. Initially this is set to 1, so that the SYS volume can be given ID 0 when it is added to the database, in case any applications make assumptions about SYS:

```
CLASS       ha_next_volume
{
    SUPERCLASS  ndr_dodb_object_header;
    PARENT      ha_server;
    PROPERTY    NDR_OS_CLASS_
                FLAG_UNREPLICATED;
    ATTRIBUTE
    {
        ndr_dodb_           dummy_key
        dummy_key
        PROPERTY            NDR_OS_ATTR_FLAG_
                            SIBLING_KEY
        COMPARISON          ndr_dodb_dummy_key_compare
        VALIDATION          ndr_dodb_dummy_key_validate;
        ha_volume_id        next_free_volume_id;
    }
}
```

A file or directory name can be 12 (2-byte) characters long:

```
CONSTANT    HA_FILENAME_MAX=24;
DATATYPE    ha_filename  STRING HA_FILENAME_MAX;
```

The ha_file_or_dir_id is a compound unique key embracing the file or directory ID that is allocated by the server, as well as the server-generated volume number. The latter is passed as a byte from class 87 NetWare Core Protocols from which it is read directly into vol (declared as a byte below). Elsewhere in the code the type ndr_host_volume_id (a UINT16) is used for the same value.

```
DATATYPE    ha_file_or_dir_id
{
    ULONG        file_or_dir;
    ha_volume_id vol;
}
```

Files and directories have many shared attributes, the most important being the file name. This must be unique for any parent directory.

```
CLASS   ha_file_or_dir
{
    PARENT      ha_directory;
    SUPERCLASS  ndr_dodb_object_header;
    ATTRIBUTE
    {
        ha_filename             filename
        PROPERTY                NDR_OS_ATTR_FLAG_SIBLING_KEY |
                                NDR_OS_ATTR_FLAG_IS_DOS_
                                FILENAME;
        ha_file_or_dir_id       id
        PROPERTY                NDR_OS_ATTR_FLAG_GLOBAL_KEY |
                                NDR_OS_ATTR_FLAG_UNREPLICATED
        GROUP                   file_or_dir_id_group;
        ULONG                   attributes;
        SHORT                   creation_date;
        SHORT                   creation_time;
        ndr_dodb_auth_id        creation_id;
        SHORT                   access_date;
        SHORT                   archive_date;
        SHORT                   archive_time;
        ndr_dodb_auth_id        archive_id;
    }
}
```

A file has some additional attributes not present in a directory, and may contain a contents fork which can be accessed via a file distributor 90 (FIG. 3):

```
CLASS       ha_file
{
    SUPERCLASS  ha_file_or_dir;
    PROPERTY    NDR_OS_CLASS_FLAG_DEFINE_REPLICAS |
                NDR_OS_CLASS_FLAG_HAS_PARTIALLY_REPLICATED_
                FILE |
                NDR_OS_CLASS_FLAG_HAS_FILE_PATH_NAME |
                NRD_OS_CLASS_FLAG_PARENT_HAS_RSC;
    ATTRIBUTE
    {
        BYTE                execute_type;
        SHORT               update_date
        property            NDR_OS_ATTR_FLAG_UNREPLICATED;
        SHORT               update_time
        property            NDR_OS_ATTR_FLAG_UNREPLICATED;
        ndr_dodb_auth_id    update_id
        property            NDR_OS_ATTR_FLAG_UNREPLICATED;
        ULONG               length
        property            NDR_OS_ATTR_FLAG_UNREPLICATED;
    }
}
```

A directory does not possess a contents fork for file distributor 90 access. The access rights mask is inherited and should be managed by like access control lists ("ACLs"):

```
CLASS         ha_directory
{
    SUPERCLASS   ha_file_or_dir;
    PROPERTY     NDR_OS_CLASS_FLAG_DEFINE_REPLICAS |
                 NDR_OS_CLASS_FLAG_HAS_FILE_PATH_NAME |
                 NDR_OS_CLASS_FLAG_HAS_RSC;
                 //replication support count
    ATTRIBUTE
    {
        BYTE              access_rights_mask;
        SHORT             update_date;
        SHORT             update_time;
        ndr_dodb_auth_id  update_id;
        SHORT             rsc
        PROPERTY          NDR_OS_ATTR_FLAG_IS_RSC |
                          NDR_OS_ATTR_FLAG_REPLICATED;
    }
}
```

The root directory must appear at the top of the hierarchy below the volume. Its name is not used; the volume name is used instead. This is the top of the replication hierarchy and therefore is the top level RSC in this hierarchy:

```
CLASS         ha_root_directory
{
    SUPERCLASS   ha_directory;
    PARENT       ha_volume;
    PROPERTY     NDR_OS_CLASS_FLAG_DEFINE_
                 REPLICAS |
                 NDR_OS_CLASS_FLAG_HAS_RSC;
}
```

In one embodiment, schemas such as the schema 84 are defined in a source code format and then compiled to generate C language header files and tables. The named source file is read as a stream of lexical tokens and parsed using a recursive descent parser for a simple LL(1) syntax. Parsing an INCLUDE statement causes the included file to be read at that point. Once a full parse tree has been built (using binary nodes), the tree is walked to check for naming completeness. The tree is next walked in three passes to generate C header (.H) files for each included schema file. The header generation passes also compute information (sizes, offsets, and so forth) about the schema which is stored in Id nodes in the tree. Finally, the complete tree is walked in multiple passes to generate the schema table C source file, which is then ready for compiling and linking into an agent's executable program.

Each disconnectable computer 40 also includes a replica manager 46 which initiates and tracks location-specific updates as necessary in response to database manager 42 requests. The replica manager is discussed in detail in connection with later Figures.

A file system interface 48 on each computer 40 mediates between the replica manager 46 and a storage device and controller 54. Suitable file system interfaces 48 include well-known interfaces 48 such as the File Allocation Table ("FAT") interfaces of various versions of the MS-DOS® operating system (MS-DOS is a registered trademark of Microsoft Corporation), the XENIX® file system (registered trademark of Microsoft Corporation), the various NOVELL file systems (trademark of Novell, Inc.), the various UNIX file systems (trademark of Santa Cruz Operations), the PCIX file system, the High Performance File System ("HPFS") used by the OS/2 operating system (OS/2 is a mark of International Business Machines Corporation), and other conventional file systems.

Suitable storage devices and respective controllers 54 include devices and controllers for the media disclosed above in connection with the storage medium 34 (FIG. 1) and other conventional devices and controllers, including non-volatile storage devices. It is understood, however, that the database replicas 56 stored on these media are not necessarily conventional even though the associated devices and controllers 54 may themselves be known in the art.

Each computer 40 also has a network link manager 50 that is capable of establishing a network connection 52 with another disconnectable computer 40. Suitable network link managers 50 include those capable of providing remote procedure calls or an equivalent communications and control capability. One embodiment utilizes "DataTalk" remote procedure call software with extended NetWare Core Protocol calls and provides functionality according to the following interface:

| | |
|---|---|
| rpc_init( ) | Initialize RPC subsystem |
| rpc_shutdown( ) | Shutdown RPC subsystem |
| rpc_execute( ) | Execute request at single location |
| rpc_ping( ) | Ping a location (testing) |
| rpc_claim___next_execute( ) | Wait until the next rpc_execute( ) is guaranteed to be used by this thread |
| rpc_free_next_execute( ) | Allow others to use rpc_execute( ) |

Those of skill in the art will appreciate that other remote procedure call mechanisms may also be employed according to the present invention. Suitable network connections 52 may be established using packet-based, serial, internet-compatible, local area, metropolitan area, wide area, and wireless network transmission systems and methods.

Figure 3:
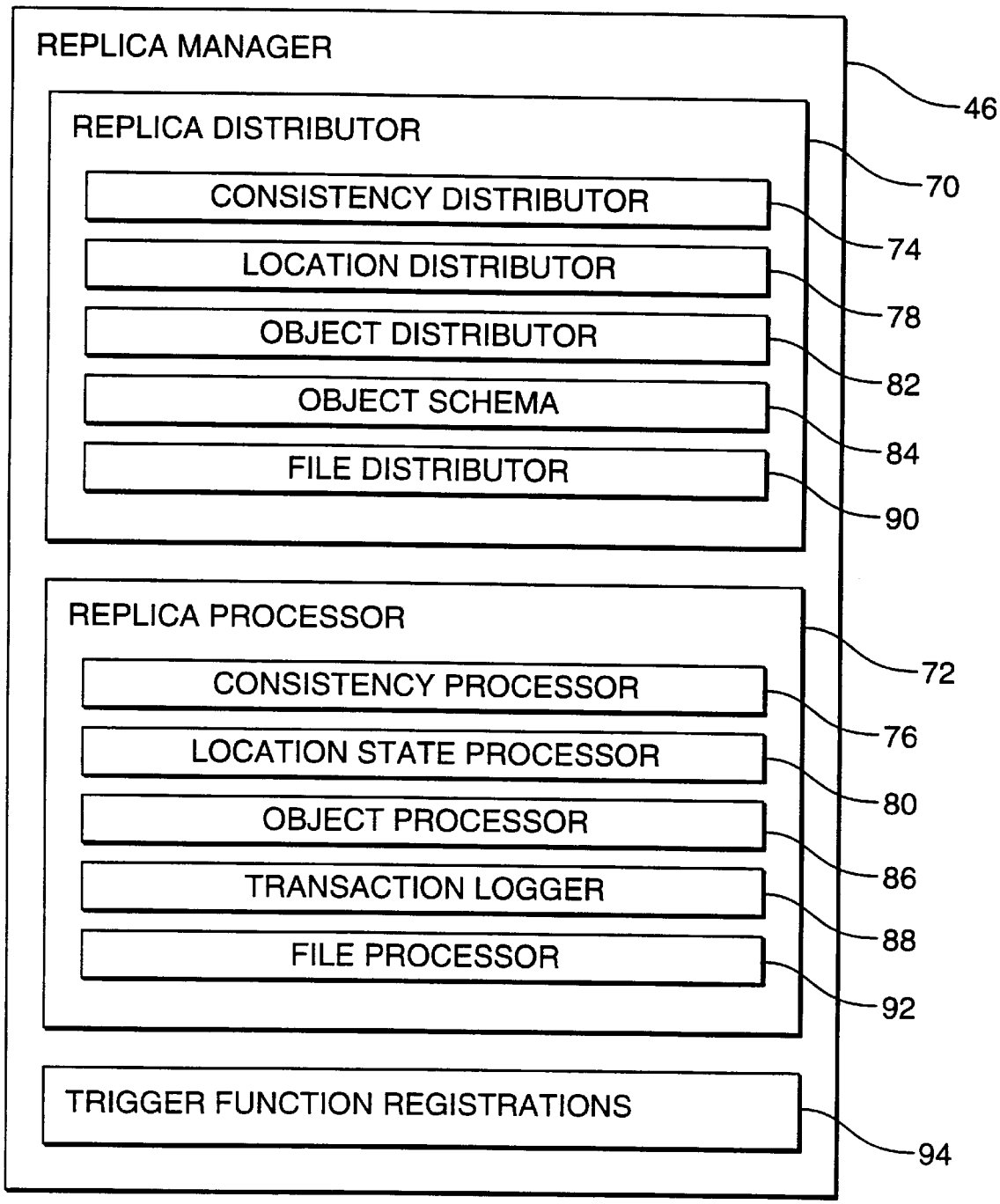
FIG. 3 is a diagram further illustrating the replica managers shown in FIG. 2.

FIGS. 2 and 3 illustrate one embodiment of the replica manager 46 of the present invention. A replica distributor 70 insulates the database manager 42 from the complexities caused by having database entries stored in replicas 56 on multiple computers 40 while still allowing the database manager 42 to efficiently access and manipulate individual database objects, variables, and/or records. A replica processor 72 maintains information about the location and status of each replica 56 and ensures that the replicas 56 tend to converge.

A consistency distributor 74 and a consistency processor 76 cooperate to maintain convergent and transactional consistency of the database replicas 56. The major processes used include an update process which determines how transaction updates are applied, an asynchronous synchronization process that asynchronously synchronizes other locations in a location set, a synchronous synchronization process that synchronously forces two locations into sync with each other, an optional concurrency process that controls distributed locking, and a merge process that adds new locations to a location set. In one embodiment, processes for synchronization and merging are implemented using background software processes with threads or similar means. The concurrency process may be replaced by a combination of retries and clash handling to reduce implementation cost and complexity.

Each location is identified by a unique location identifier. A "location sync group" is the group of all locations that a specific location synchronizes with. The location sync group for a database replica 56 on a client 20 is the client and the server 16 or other computer 28 that holds a master replica 56; the computer 28 holding the master replica 56 is the "storage location" of the target database. The location sync group for the computer 28 that holds the master replica 56 is all computers 28 connectable to the network that hold a replica 56. A "location set" is a set of presently connected locations in a location sync group. Locations in an "active location set" have substantially converged, while those in a "merge location set" are currently being merged into the active location set. Objects are read at a "reference location" and updated at an "update location," both of which are local when possible for performance reasons. To support concurrency control, objects require a "lock location" where they are locked for read or update; the local location is the same for all processes in a given location set.

According to one update process of the present invention, the updates for a single transaction are all executed at one update location. Each group of updates associated with a single transaction have a processor transaction identifier ("PTID") containing the location identifier of the update location and a transaction sequence number. The transaction sequence number is preferably monotonically consecutively increasing for all completed transactions at a given location, even across computer 28 restarts, so that other locations receiving updates can detect missed updates.

The PTID is included in update details written to an update log by an object processor 86. An update log (sometimes called an "update stream") is a chronological record of operations on the database replica 56. Although it may be prudent to keep a copy of an update log on a non-volatile storage device, this is not required. The operations will vary according to the nature of the database, but typical operations include adding objects, removing objects, modifying the values associated with an object attribute, modifying the attributes associated with an object, and moving objects relative to one another.

The PTID is also included as an attribute of each target database object to reflect the latest modification of the object. In one embodiment, the PTID is also used to create a unique (within the target database) unique object identifier ("UOID") when a target database object is first created.

A target database object may contain attributes that can be independently updated. For instance, one user may set an archive attribute on a file while a second user independently renames the file. In such situations, an object schema 84 may define attribute groups. A separate PTID is maintained in the object for each attribute group, thereby allowing independent updates affecting different attribute groups of an object to be automatically merged without the updates being treated as a clash.

The consistency distributor 74 gathers all of the updates for a single transaction and sends them, at close transaction time, to the update location for the transaction. The consistency processor 76 on the update location writes the updates to a transaction logger 88. In one embodiment, the transaction logger 88 buffers the updates in memory (e.g. RAM). If the update location is not local then the updates are committed to the transaction log and the PTID for the transaction is returned, so that the same updates can be buffered locally; this allows all updates to be applied in order locally. In this manner the transaction updates are applied to the update location.

An objective of one asynchronous synchronization process of the present invention is to keep the rest of the locations in the location set in sync without unacceptable impact on foreground software process performance. This is achieved by minimizing network transfers.

A process of the consistency processor 76 (such as a background software process) either periodically or on demand requests the transaction logger 88 to force write all pending transactions to the log and (eventually) to the target database. The consistency processor 76 also causes the batch of updates executed at an update location to be transmitted to all other locations in the current location set as a "SyncUpdate" request. These updates are force written to the log before they are transmitted to other locations, thereby avoiding use of the same transaction sequence number for different transactions in the event of a crash.

The SyncUpdate requests are received by other locations in the same location set and applied to their in-memory transaction logs by their respective consistency processors 76. Each consistency processor 76 only applies SyncUpdate transactions which have sequence numbers that correspond to the next sequence number for the specified location.

The consistency processor 76 can determine if it has missed updates or received them out of order by examining the PTID. If updates are missed, the PTID of the last transaction properly received is sent to the consistency distributor 74 that sent out the updates, which then arranges to send the missing updates to whichever consistency processors 76 need them.

Acknowledged requests using threads or a similar mechanism can be used in place of unacknowledged requests sent by non-central locations. Non-central locations (those not holding a master replica 56) only need to synchronize with one location and thus only require a small number of threads. To promote scalability, however, central locations preferably use unacknowledged broadcasts to efficiently transmit their SyncUpdate requests.

The asynchronous synchronization process causes SyncUpdate requests to be batched to minimize network transfers. However, the cost paid is timeliness. Accordingly, a synchronous synchronization process according to the present invention may be utilized to selectively speed up synchronization. The synchronous synchronization process provides a SyncUptoPTID request and response mechanism.

In one embodiment, the SyncUptoPTID mechanism utilizes a SyncState structure which is maintained as part of a location state structure or location list that is managed by a location state processor 80 in the memory of each computer 28. The SyncState structure for a given location contains a location identifier and corresponding transaction sequence number for the most recent successful transaction applied from that location. The SyncState structure is initialized from the update log at startup time and updated in memory as new transactions are applied.

A SyncUptoPTID request asks a destination to bring itself up to date with a source location according to a PTID. The destination sends a copy of the SyncState structure for the source location to that source location. The source location then sends SyncUpdate requests to the destination location, as previously described, up to an including the request with the PTID that was specified in the SyncUptoPTID request. In a preferred embodiment, the central server is a NetWare server and the SyncUptoPTID requirements are approximately 100 bytes per location, so scalability is not a significant problem for most systems.

A merge process according to the present invention includes merging location sets when disconnected disconnectable computers are first connected or reconnected. For instance, merging location sets normally occurs when a computer new to the network starts up and merges into an existing location set. Merging can also happen when two sets of computers become connected, such as when a router starts.

Merging occurs when two replicas 56 are resynchronized after the computers 28 on which the replicas 56 reside are reconnected following a period of disconnection. Either or both of the computers 28 may have been shut down during the disconnection. A set of updates are "merged atomically" if they are merged transactionally on an all-or-nothing basis. A distributed database is "centrally synchronized" if one computer 28, sometimes denoted the "central server," carries a "master replica" with which all merges are performed.

Portions of the master replica or portions of another replica 56 may be "shadowed" during a merge. A shadow replica, sometimes called a "shadow database", is a temporary copy of at least a portion of the database. The shadow database is used as a workspace until it can be determined whether changes made in the workspace are consistent and thus can all be made in the shadowed replica, or are inconsistent and so must all be discarded. The shadow database uses an "orthogonal name space." That is, names used in the shadow database follow a naming convention which guarantees that they will never be confused with names in the shadowed database.

A "state-based" approach to merging compares the final state of two replicas 56 and modifies one or both replicas 56 to make corresponding values equal. A "log-based" or "transaction-based" approach to merging incrementally applies successive updates made on a first computer 28 to the replica 56 stored on a second computer 28, and then repeats the process with the first computer's replica 56 and the second computer's update log. A hybrid approach uses state comparison to generate an update stream that is then applied incrementally. The present invention preferably utilizes transaction-based merging rather than state-based or hybrid merging.

As an illustration, consider the process of merging a single new location A with a location set containing locations B and C. In one embodiment, the following performance goals are satisfied:

(a) Use of locations B and C is not substantially interrupted by synchronization of the out-of-date location A with B and C; and (b) Users connected to location A (possibly including multiple users if location B is a gateway) are able to see the contents of the other locations in the set within a reasonable period of time.

Merging typically occurs in three phases. During a "merging out" phase location A sends newer updates to location B. For instance, if A's location list contains PTID 50:14 (location identifier:transaction sequence number) and B's location list contains PTID 50:10, then the newer updates sent would correspond to PTID values 50:11 through 50:14.

During a "merging in" phase new updates in the merge location B are merged into A's location. For instance, suppose A's location list contains PTIDs 100:12 and 150:13 and B's location list contains PTIDs 100:18 and 150:13. Then the new updates would correspond to PTID values 100:13 through 100:18. If updates are in progress when merging is attempted, the initial attempt to merge will not fully succeed, and additional iterations of the merging in and merging out steps are performed.

In one embodiment, merging does not include file contents synchronization. Instead file contents are merged later, either by a background process or on demand triggered by file access. This reduces the time required for merging and promotes satisfaction of the two performance goals identified above. In embodiments tailored to "slow" links, merging is preferably on-going to take advantage of whatever bandwidth is available without substantially degrading the perceived performance of other processes running on the disconnectable computers.

In embodiments employing an update log, the log is preferably compressed prior to merging. Compression reduces the number of operations stored in the log. Compression may involve removing updates from the log, altering the parameters associated with an operation in a given update, and/or changing the order in which updates are stored in the log.

In one embodiment, all Object Database calls come through the consistency distributor 74, which manages distributed transaction processing and maintains consistency between locations. Almost all calls from a location distributor 78 are made via the consistency distributor 74 because the consistency distributor 74 supports a consistent view of the locations and the database replicas 56 on them.

The consistency distributor 74 and an object distributor 82 support multiple concurrent transactions. This is needed internally to allow background threads to be concurrently executing synchronization updates. It could also be used to support multiple concurrent gateway users. In an alternative embodiment, multiple concurrent transactions on the same session is supported through the consistency distributor 74.

In one embodiment, the consistency distributor 74 and the consistency processor 76 are implemented in the C programming language as a set of files which provide the functionality described here. Files CD.H and CD.C implement part of the consistency distributor 74. A separate module having files CD_BG.H and CD_BG.C is responsible for background processes associated with merging and synchronization. A module having files CDI.H and CDI.C contains functions used by both the CD and CD_BG modules. These modules provide functionality according to the following interface:

| | |
|---|---|
| cd_init | Init CD |
| cd_shutdown | Shutdown CD |
| cd_create_replica | Create a replica of a specified database |
| cd_remove_replica | Remove a replica of a specified database |
| cd_load_db | Load an existing database |
| cd_unload_db | Unload an existing database |
| cd_merge_start | Start merge of active and merge location sets |
| cd_merge_stop | Stop merge |
| cd_start_txn | Start a CD transaction |
| cd_set_txn_ref_loc | Set reference/update lid (location identifier) for txn (transaction) |
| cd_get_txn_desc | Get a txn descriptor given a txn |

-continued

| | id |
|---|---|
| cd_abort_txn | Abort a CD transaction |
| cd_end_txn | End a CD transaction |
| cd_commit | Commit all previously closed txns to disk |
| cd_execute_txn | Execute locks and updates for a txn |
| cd_read | Do read or lookup request |
| cd_readn | Do readn |
| cd_lookup_by_uoid | Do lookup using UOID |
| cd_add_lock | Add an object or agent lock |
| cd_remove_lock | Remove an object or agent lock |
| cd_modify_attribute | Modify a single attribute in a previously read object |
| cd_init_new_doid | Setup all fields in a new doid |
| cd_add | Add a new object |
| cd_remove | Remove an object |
| cd_move | Move an object |
| cd_set_marker | Add marker point to txn |
| cd_revert_to_marker | Revert txn state to last marker |
| cd_get_effective_access_right | Get the effective access rights for the current session and object |
| cd_convert_uoid2doid | Convert UOID to DOID |
| cd_sync_object | Get the server to send a newly replicated object |
| cd_bg_init | Initialize CD background processes |
| cd_bg_merge | Execute a background merge |
| cd_bg_sync_remote_upto_ptid | Bring remote location up to date with local PTID |
| cdi_init | |
| cdi_shutdown | |
| cdi_execute_ack_sys | Execute acknowledged request using system session |
| cdi_execute_ack | Execute acknowledged request |
| cdi_apply_locks | Apply locks for txn |
| cdi_abort_prc_txn | Remove all locks already set for a txn |
| //Forced update location (used to change update location when executing clash handler functions) | |
| cdi_register_forced_update_location | |
| | Register location to be used as update location for thread |
| cdi_unregister_forced_update_location | |
| | Unregister location to be used as update location for thread |
| cdi_get_forced_update_location | |
| | Get forced update location for thread |
| cdi_sync_upto_ptid | Bring location up to date with PTID |
| cdi_sync_upto_now | Bring location up to date with latest PTID |
| cdi_sync_loc_list | Make my location list consistent with destination location list and return info on mismatch of PTIDs |
| cdi_read_loc_list | Read location list |
| cdi_sync_upto_dtid | Bring location up to date with DTID |

Since updates are cached during a transaction, special handling of reads performed when updates are cached is required. In one embodiment, the caller of cd_read( ) or cd_readn( ) sees the results of all updates previously executed in the transaction. In an alternative embodiment, for cd_read( ) reads will see all previously added objects and will see the modified attributes of objects, but will not see the effects of moves or removes. Thus if an object is removed during a transaction the read will behave as if it has not been removed. The same is true for moved objects. Modifications to keys will have no effect on reads using the keys. The cd_readn( ) function behaves as if none of the updates in the current transaction have been applied.

In one embodiment, the consistency processor 76, which processes all distributed object database requests, includes background processes that manage object database updates on local locations and synchronization of locations. Within this embodiment, a CP module contains a dispatcher for all requests which call functions that have a prefix of "cpXX_"; a CPR module processes read requests; a CPU module processes update and lock requests; a CPSM module processes synchronization and merging requests; a CP_BG module controls background processing which includes scheduling multiple background threads, controlling the state of all local locations and synchronization of local locations with local and remote locations; and a CPUI module provides functions that are shared by the CP_BG and CPx modules. These modules provide functionality according to the following interface:

| | |
|---|---|
| cp_init | Includes performing mounting of local locations and recovery of TL (transaction logger 88) and OP (object processor 86) |
| cp_shutdown | Shutdown CP |
| cp_process | Process a consistency request |
| cp_clear_stats | Reset CP statistics |
| cp_dump_stats | Dump CP statistics to the log |
| cpr_process_read | Process OP read or lookup request |
| cpr_process_readn | Process readn request |
| cpu_register_dtid | Register use of a DTID at a reference location |
| cpu_execute_txn | Execute single txn at reference location |
| cpu_commit | Commit all txns for session |
| cpu_add_locks | Add list of locks |
| cpu_remove_locks | Remove list of locks |
| cpu_abort_prc_txn | Remove object locks for specified transaction |
| cpsm_sync_upto_ptid | Bring remote locations up to date as far as given PTID |
| cpsm_get_latest_ptid | Obtain the latest PTID |
| cpsm_get_sync_object | Remote machine wants to sync a newly replicated object |
| cpsm_sync_object | Add a newly replicated object to the local database |
| cpsm_get_sync_update | Get a local sync_update |
| cpsm_sync_update | Apply multiple update txns to location |
| cpsm_read_loc_list | Read list of locations and states |
| cpsm_sync_loc_list | Sync location list |
| cpsm_merge_loc_list | Attempt to merge my location list with other location list |
| cpsm_sync_finished | Remote machine is notifying us that a sync_upto_ptid has completed |
| cpsm_request_merge | Request a merge of this location with the central server |
| cpui_init | Initialize internal structures |
| cpui_shutdown | Shutdown CPUI subsystem |
| cpui_execute_txn | Execute update txn at a local location |
| cpui_apply_update_list_to_db | Apply an update list to an OP database |
| cpui_commit | Commit all txns at location |
| cpui_flush | Flush all txns to object database at location |
| cpui_replay_logged_transactions | Replay transactions from the log that have not been committed to OP |
| cp_bg_init | Initialize CP_BG subsystem |
| cp_bg_shutdown | Shutdown CP_BG subsystem |
| cp_bg_handle_distributed_request | Handle a request that requires remote communication |
| cp_bg_notify_close_txn | Notify CP_BG of a closed transaction |
| cp_bg_notify_commit | Notify CP_BG that all txns are |

| | |
|---|---|
| cp_bg_attempt_send_flush | committed at a location<br>Attempt to send out and flush txns |
| cp_bg_notify_load | Notify CP_BG of a newly loaded DB |
| cp_bg_notify_unload | Notify CP_BG of a newly unloaded DB |
| cp_bg_flush_upto_ptid | Force all transactions upto the specified ptid to the migrated state |

The location distributor 78 in each replica manager 46 and the location state processor 80 are used to determine the storage locations of database entries. In one embodiment, the location state processor 80 uses a cache of the current state of locations and maintains state information on the merging process. The location state processor 80 is responsible for processing remote requests which pertain to the location list.

All locations that are up at any time within a sync group are in either the ACTIVE or MERGE location sets. The ACTIVE location set contains all locations that are in sync with the local location up to certain sync watermarks. The MERGE location set contains all nodes that are not in sync with the local location, either through not having updates the active set does have, or through having updates the active set does not have.

Locations in the MERGE set enter the ACTIVE set through the two-way merging process described above, under control of the consistency distributor 74 and the consistency processor 76. Once in the ACTIVE set, a location should never leave it until the location goes down.

Each location continuously sends out its local updates to other members of its active location set as part of the merging process. The PTID in a location's log that was last sent out in this manner is called the location's "low watermark" PTID. For a location to enter the active set it must have all PTIDS in its local log up to the low watermark PTID; only the merging process used to move a location from the MERGE to the ACTIVE location set is capable of propagating early transactions. Each location also maintains a "high watermark" PTID which is the last transaction (in local log order) that has been committed, and is thus a candidate for sending out in a background sync update.

The replica managers 46 track the last transaction sequence number made by every location up to the low watermark PTID in order to know whether a location is up to date with another location's low watermark. The log ordering may be different in different locations, up to an interleave.

One embodiment of the location state processor 80 provides functionality according to the following interface:

| | |
|---|---|
| ls_init | Initialize LS |
| ls_shutdown | Shutdown LS |
| ls_close_db | Clear out all entries for a database |
| ls_allocate_new_lid | Allocate a new location identifier for use by a new replica |
| ls_add | Add a new location |
| ls_remove | Remove a location |
| ls_modify_local_tid | Modify a location entry's local transaction identifier (sequence number) |
| ls_modify_state | Modify a location entry's state |
| ls_get_loc_list | Get list of locations |
| ls_get_loc_sync_list | Get list of locations for syncing |
| ls_get_next_loc | Get next location |
| ls_get_first_in_loc_list | Get first location in list that is in current location set |
| ls_get_loc_entry | Get location entry given lid (location identifier) |
| ls_get_first_ref_loc | Get nearest reference location in provided list |
| ls_get_first_ref_loc_in_list | Get first reference location in provided list |
| ls_get_lock_loc | Get lock location for location set |
| ls_higher_priority | Determine which location has highest priority |
| ls_complete_merge | Complete the merge process |
| ls_set_sync_watermarks | Set the high and low watermark PTIDS used in syncing and merging |

The object distributor 82 manages ACLs and otherwise manages access to objects in the database. In one embodiment, the object distributor 82 provides functionality according to this interface:

```
typedef void* ndr_od_db_handle;          //open database handle
//lint -strong(AJX, ndr_od_txn_id)
//object distributor transaction instance identifier
typedef void* ndr_od_txn_id;
#define NDR_OD_INVALID_TXN_ID      (ndr_od_txn_id)0
typedef struct //Txn info returned by NdrOdGetTxnInfo
{
    ndr_od_db_handle       db;          /* database */
    ndr_dodb_session_type  session;     /* session */
} ndr_od_txn_info;
//Start a new clash txn for this session
ndr_ret EXPORT
NdrOdStartClashTxn (
    ndr_od_db_handle       db_handle,
    /* —> Handle to the open DB */
    ndr_dodb_session_type  session,     /* —> session */
    ndr_od_txn_id          *txn_id);    /* <— txn_id */
//Find out what databases are available
ndr_ret EXPORT
NdrOdEnumerateDBs (
    ndr_od_enum_flags      flags,
    /* —>Determines which databases are included in search */
    ndr_os_db_name         search_name,
    /* —> The database name (may be wild)*/
    ndr_os_db_type_name    search_type,
    /* —> The database type (may be wild) */
    ndr_dodb_database_id_type  search_id,
    /* —> The database id (may be wild) */
    ndr_os_db_name         name,
    /* <— The database name */
    ndr_os_db_type_name    type,
    /* <— The database type */
    ndr_dodb_database_id_type  *id,
    /* <— The database id */
    UINT16                 *index);
    /* <—> Set to 0 to start else use
    previous returned value */
//Start a new txn for this session
ndr_ret EXPORT
NdrOdStartTxn (
    ndr_od_db_handle       db_handle,
    /* —> Handle to the open DB */
    ndr_dodb_session_type  session,
    /* —> session */
    ndr_od_txn_id          *txn_id);
    /* <— txn id */
```

The interface includes NdrOdCloseTxn( ), which closes updates for the current transaction and causes all updates since the last NdrOdStartTxn( ) call to be applied. Either all updates will be applied, or none will be applied. NdrOdCloseTxn( ) does not commit the updates, that is, they are not written to disk. NdrOdCommit( ) is used to commit closed updates to disk. However, after calling NdrOdCloseTxn( ), no further updates may be applied in the transaction. This function is also where all the locking and updates previously cached actually get done. Consequently, most locking and/or consistency errors are reported here (after synchronization) so that the transaction can be retried:

```
ndr_ret EXPORT
NdrOdCloseTxn(ndr_od_txn_id      txn_id);       /* —> txn_id */
```

The NdrOdEndTxn( ) function ends the current transaction and executes an implicit NdrOdCloseTxn( ). No error is returned if no transaction is currently open:

```
ndr_ret EXPORT
NdrOdEndTxn(ndr_od_txn_id        txn_id);       /* —> txn id */
     The NdrOdCommit function commits all previously closed
transactions for the session to disk:
ndr_ret EXPORT
NdrOdCo|it(
     ndr_od_db_handle            db,            /* —> DB to commit */
     ndr_dodb_session_type       session);      /* —> session */
     The interface also includes the following functions:
//Abort current txn
ndr_ret EXPORT
Ndr_OdAbortTxn(ndr_od_txn_id     txn_id);       /* —> txn_id */
//Get info on current txn
ndr_ret EXPORT
NdrOdGetTxnInfo(
     ndr_od_txn_id               txn_id,        /* —> txn_id */
     ndr_od_txn_info*            txn_info);     /* <— txn_info */
//Lookup an object using parent Distributed Object Identifier
//(DOID; encodes location info to assist in sending distributor
//requests to the right machine; includes UOID) & sibling key
or
//using global key; the key value MUST be a contiguous
structure.
ndr_ret EXPORT
NdrOdLookupByKey(
     ndr_od_txn_id               txn_id,        /* —> txn_id */
     ndr_dodb_access_rights_type rights_needed_on_parent,
     /* —> rights needed on parent */
     ndr_os_class                class_id,
     /* —> Class id. of superclass to match */
     /* Acts as filter when key contains wildcard. */
     ndr_dodb_doid_class*        parent_doid,   /* —> Parent DOID */
     ndr_os_attribute            key_id,
     /* —> Type of unique key */
     UINT16                      key_length,
     /* —> Length, in bytes, of the
     key value */
     VOID*                       key,           /* —> Key value */
     ndr_dodb_doid_class* doid);
     /* <— Pointer to returned DOID of object */
//Lookup an object using DOID
//This checks the existence of the object and updates its DOID
ndr_ret EXPORT
NdrOdLookup(
     ndr_od_txn_id               txn_id,        /* —> txn_id */
     ndr_dodb_access_rights_type rights_needed_on_parent,
     /* —> rights needed on parent */
     ndr_dodb_doid_class*        doid,          /* —> DOID */
     ndr_dodb_doid_class*        new_doid);
     /* <— Updated DOID of object */
//Lookup an object's parent using DOID.
ndr_ret EXPORT
NdrOdLookupParent(
     ndr_od_txn_id               txn_id,        /* —> txn_id */
     ndr_dodb_access_rights_type rights_needed_on_parent,
     /* —> rights needed on parent */
     ndr_dodb_doid_class*        doid,          /* —> DOID */
     ndr_dodb_doid_class*        parent_doid);
     /* <— Parent DOID of object */
//Read an object using parent DOID and sibling key or using
//global key. It's always OK to read an object with an out of
//date parent_doid as the parent's lid is not used to get the
//reference location. The key value MUST be a contiguous
//structure.
ndr_ret EXPORT
Ndr_OdReadByKey(
     ndr_od_txn_id               txn_id,        /* —> txn_id */
```

```
    ndr_dodb_access_rights_type  rights_needed_on_parent,
    /* —> rights needed on parent */
    ndr_os_class                 class_id,
    /* —> Class id. of superclass to match */
    /* and superclass structure to be returned */
    ndr_dodb_doid_class*         parent_doid,    /* —> Parent DOID */
    ndr_os_attribute             key_id,         /* —> Type of unique key */
    UINT16                       key_length,
    /* —> Length, in bytes, of the key value */
    VOID*                        key,            /* —> Key value */
    UINT16                       max_length,
    /* —> Max length of data read */
    UINT16*                      length,
    /* <— Final length of data read */
    ndr_os_object*               object);
    /* —> Pointer to object buffer */
//Read an object using DOID
ndr_ret EXPORT
Ndr_OdRead(
    ndr_od_txn_id                txn_id,         /* —> txn_id */
    ndr_dodb_access_rights_type  rights_needed_on_parent,
    /* —> rights needed on parent */
    ndr_os_class                 class_id,
    /* —> Class id. of superclass to match */
    /* and superclass structure to be returned */
    ndr_dodb_doid_class*         doid,           /* —> DOID */
    UINT16                       max_length,
    /* —> Max length of data read */
    UINT16*                      length,
    /* <— Final length of data read */
    ndr_os_object*               object);
    /* —> Pointer to object buffer */
```

An NdrodReadn( ) function which reads multiple objects using parent DOID and wildcards behaves as if none of the updates in the transaction have been applied. Interpretation of wildcard values in the key is done by registered keying functions. NdrOdReadn( ) reads either up to max_objects, or up to the maximum number of objects that will fit in the max_length object buffer:

```
ndr_ret EXPORT
Ndr_OdReadn(
    ndr_od_txn_id                txn_id,         /* —> txn_id */
    ndr_dodb_access_rights_type  rights_needed_on_parent,
    /* —> rights needed on parent */
    ndr_os_class                 class_id,
    /* —> Class id. of superclass to match
    and superclass structure to be returned */
    ndr_os_class                 read_as_class,
    /* —> Class id. target objects are to be read as */
    ndr_dodb_doid_class*         parent_doid     /* —> Parent Doid */
    ndr_os attribute             key_id,         /* —> Type of unique key */
    UINT16                       key_length,
    /* —> Length, in bytes, of the key value */
    VOID*                        key,
    /* —> Key value to match, can contain wildcard.
    NULL implies match all objects under parent containing
    the key id */
    UINT16                       max_length,
    /* —> Max length of data read */
    UINT16*                      length,
    /* <— Final length of data read */
    ndr_dodb_object_list*        object_list,
    /* —> Pointer to object buffer */
    UINT16                       max_objects,
    /* —> Max number of objects read. Use OD_MAX_OBJECTS to
    read max that will fit in buffer */
    ndr_dodb_context_type*       context);
    /* < > —> set to DODB_CONTEXT_START to start a new read,
    or a previously returned context to continue a previous
    read. <— set to DODB_CONTEXT_END if all objects read,
    or a value that can be used to continue reading at the
    next object */
#define NDR_OD_MAX_OBJECTS                       0xFFFF
```

The NdrOdLock( ) function explicitly adds an exclusive or shared lock to an object using the object's DOID. The lock call is called implicitly for all updates, but should be called explicitly if read locks are required. The lock is only taken when the transaction is initially executed. It is not executed when the update is merged. The lock is applied at the end of a transaction. If it fails the transaction is aborted and should be re-tried by the caller. One embodiment does not utilize locks to control concurrency but instead relies on retries and clash handling:

```
ndr_ret EXPORT
NdrOdLock(
        ndr_od_txn_id           txn_id,         /* —> txn_id */
        ndr_dodb_class*         doid,           /* —> Objects's DOID */
        BOOLEAN                 is_exclusive);
        /* —> TRUE => take exclusive lock */
        The interface also includes:
//Add agent defined lock to object
ndr_ret EXPORT
NdrOdAddAgentLock(
        ndr_od_txn_id           txn_id,         /* —> txn_id */
        ndr_dodb_doid_class*    doid,           /* —> Objects's DOID */
        ndr_dodb_lock_type      lock_type,
        /* —> Type of lock */
        ndr_dodb_lock_flags_type  lock_flags,
        /* —> Flags that allow multiple locks to be taken
        in single call. Each bit corresponds to a separate
        lock, e.g. used for read/write flags on file open */
        ndr_dodb_lock_deny_flags_type
                                deny_flags);
        /* —> Bits set that correspond to lock_flags bits
        causes the corresponding lock to be denied */
//Remove agent defined lock
ndr_ret EXPORT
NdrOdRemoveAgentLock(
        ndr_od_txn_id           txn_id,         /* —> txn_id */
        ndr_dodb_doid_class*    doid,           /* —> Objects's DOID */
        ndr_dodb_lock_type      lock_type);
        /* —> Type of lock */
```

The following four calls are used to append various types of updates onto an open transaction. Any of them may return NDR_OK indicating success, NDR_CD_EXCEEDED_TXN_LIMITS indicating that transaction limits have been exceeded, or some other error indicator. In the case of exceeded transaction limits the transaction state will not have been changed and the failed call will have had no effect. The caller is expected to commit or abort the transaction as appropriate. In all other error cases the transaction is automatically aborted before returning the error to the caller:

```
//Modify a single attribute in a previously read object
//The object distributor caches the modifications and only
//applies them at close txn time
ndr_ret EXPORT
Ndr_OdModifyAttribute(
        ndr_od_txn_id                   txn_id,         /* —> txn_id */
        ndr_dodb_access_rights_type     rights_needed_on_parent,
        /* —> rights needed on parent */
        ndr_dodb_doid_class*            doid,
        /* —> DOID of previous read version of object.
        Used to verify object has not been modified by another
        user since previously read */
        ndr_os_attribute                attribute_id,
        /* —> Identifies attribute to be modified */
        VOID*                           value);         /* —> New attribute value */
//Add a new object
//The DOID attribute does not need to be filled in by the
caller.
//The DOID will be set up before writing the object to the
//database.
ndr_ret EXPORT
NdrOdAdd(
        ndr_od_txn_id                   txn_id,         /* —> txn_id */
        ndr_dodb_access_rights_type     rights_needed_on_parent,
```

```
        /* —> rights needed on parent */
        ndr_dodb_doid_class*      parent_doid,      /* —> Parent DOID */
        ndr_os_class              class_id,
        /* —> Class id of object */
        ndr_os_object*            object);
        /* —> Pointer to agent object */
//Remove an object using DOID
ndr_ret EXPORT
NdrOdRemove(
        ndr_od_txn_id             txn_id,           /* —> txn_id */
        ndr_dodb_access_rights_type  rights_needed_on_parent,
        /* —> rights needed on parent */
        ndr_dodb_doid_class*      doid);            /* —> DOID */
//Move an object using DOID
ndr_ret EXPORT
NdrOdMove(
        ndr_od_txn_id             txn_id,           /* —> txn_id */
        ndr_dodb_access_rights_type  rights_needed_on_parent,
        /* —> rights needed on parent */
        ndr_dodb_doid_class*      doid,             /* —> DOID */
        ndr_dodb_doid_class*      target_parent_doid);
        /* —> Target parent DOID */
//Set a marker in an open transaction. The state of the
//transaction at the time the marker is set can be reverted
//to at any time before the transaction is closed by
//calling NdrOdRevertToMarker( ).
//Only the last marker in a transaction is significant.
//This call may return NDR_CD_EXCEEDED_TXN_LIMITS which
//should be treated as for the update appending calls above
ndr_ret EXPORT
NdrOdSetMarker(ndr_od_txn_id     txn_id);          /* —> txn_id */
//Revert a txn's state to the last previously marked state
ndr_ret EXPORT
NdrOdRevertToMarker (ndr_od_     txn_id);          /* —> txn_id */
txn_id
//Add a <user-id, rights-mask> pair to an object's
//access rights, overwriting any previous rights-mask for
//that user
ndr_ret EXPORT
NdrOdAddAccessRight(
        ndr_od_txn_id             txn_id,           /* —> txn_id */
        ndr_dodb_dboid_class*     doid,             /* —> Object DOID */
        ndr_dodb_auth_id_type     user,
        /* —> User to whom rights are to be granted */
        ndr_dodb_access_rights_type  rights);
        /* —> Rights to be granted to that user */
//Remove any <user-id, rights-mask> pair from an object's
//access rights for a given user-id
ndr_ret EXPORT
NdrOdRemoveAccessRight(
        ndr_od_txn_id             txn_id,           /* —> txn_id */
        ndr_dodb_doid_class*      doid,             /* —> Object DOID */
        ndr_dodb_auth_id_type     user);
        /* —> User whose rights are to be revoked */
//Get the array of all <user-id, rights-mask> pairs for an
object
ndr_ret EXPORT
NdrOdGetAccessRights(
        ndr_od_txn_id             txn_id,           /* —> txn_id */
        ndr_dodb_dboid_class*     doid,             /* —> Object DOID */
        UINT16*                   acl_count,
        /* <— Number of ACL entries for that object */
        ndr_dodb_acl_element_type*  acl);
        /* <— Rights information for that object */
//Get the effective access rights for the current session
//for an object
ndr_ret EXPORT
Ndr_OdGetEffectiveAccessRight(
        ndr_od_txn_id             txn_id,           /* —> txn_id */
        ndr_dodb_doid_class*      doid,             /* —> Object DOID */
        ndr_dodb_access_rights_type*  rights);
        /* <— Effective rights for the current session */
//Convert UOID to DOID
ndr_ret EXPORT
NdrOdConvertUoid2Doid(
        ndr_os_class              class_id,
        /* —> Class id. of object */
        ndr_dodb_uoid type*       uoid,             /* —> UOID */
        ndr_dodb_doid_class*      doid);            /* <— Updated DOID */
//Convert UOID to DOID
```

```
ndr_ret EXPORT
NdrOdConvertUoid2LocalDoid(
    ndr_os_class           class_id,
    /* —> Class id. of object */
    ndr_dodb_lid_type      location,
    /* —> Location on which object exists */
    ndr_dodb_uoid_type*    uoid,      /* —> UOID */
    ndr_dodb_doid_class*   doid);     /* <— Updated DOID */
```

The object processor 86 provides a local hierarchical object-oriented database for objects whose syntax is defined in the object schema 84. In one embodiment, the object processor 86 is built as a layered structure providing functionality according to an interface in the structure which is described below. The embodiment also includes a module for object attribute semantics processing, a set of global secondary indexes, a hierarchy manager, a B-tree manager, a record manager, and a page manager. Suitable modules and managers are readily obtained or constructed by those familiar with database internals. A brief description of the various components follows.

The page manager provides functionality according to a logical file interface of free-form fixed length pages addressed by logical page number. Rollback and commit at this level provide anti-crash recovery.

The record manager provides for the packing of variable length keyed records into fixed length pages.

The B-tree manager uses the facilities of the record and page managers to provide general B-trees supporting variable length records and variable length keys.

The hierarchy manager imposes a hierarchical structure on records by use of structured B-tree keys and a global UOID→full name index.

The secondary index manager provides generalized global indexing capabilities to records.

The attribute manager interprets the schema 84 in order to raise the interface of the object processor 86 from a record-level to an object-level interface.

The interface module of the object processor 86 uses lower level interfaces to provide functionality according to the following interface:

| | |
|---|---|
| op_init | Initializes object processor |
| op_shutdown | Shuts down object processor |
| op_add_database | Creates a new volume |
| op_mount_database | Mounts a specified volume for use |
| op_dismount_database | Dismounts the specified volume |
| op_remove_database | Removes a specified volume (permanently) |
| op_read | Read an object by UOID |
| op_readn | Read one or more objects with wildcards |
| op_execute_update_list | Apply one or more updates |
| op_commit | Commit updates to a specified volume |
| op_rollback | Rollback to the last committed state |
| op_free_inversion_list | Free up an inversion list returned from update execution |
| op_clear_stats | Clear object processor statistics |
| op_dump_stats | Dump statistics to the log |

Due to higher level requirements of trigger functions in a set of trigger function registrations 94, in one embodiment it is necessary to have the old values of modified attributes available on a selective basis. This is done by means of a 'preservation list' produced by op_execute_updates( ). The preservation list contains an update list specifying old attribute values for all executed updates that require it (as determined by a callback function), together with pointers to the original causative updates. These updates may not actually be present in the input update list, as in the case of an object removal that generates removes for any descendant objects it may have. Preservation lists reside in object processor 86 memory and must thus be freed up by the caller as soon as they are no longer needed.

The transaction logger 88 provides a generic transaction log subsystem. The logs maintained by the logger 88 provide keyed access to transaction updates keyed according to location identifier and processor transaction identifier (PTID). In one embodiment, a non-write-through cache is used to batch uncommitted transaction updates.

The transaction logger 88 is used by the consistency processor 76 to support fast recovery after a crash. Recovery causes the target database to be updated with any transactions that were committed to the log by the logger 88 but were not written to the target database. The log file header contains a "shutdown OK" flag which is used on startup to determine if recovery is required for the location.

The transaction logger 88 is also used by the consistency processor 76 to support fast synchronization. The update log created by the logger 88 is used to replay the updates from one location to a second location using minimal disk and network 10 transfers.

The file distributor 90 distributes file contents to appropriate locations in the network 10. A file processor 92 supports each file distributor 90 by carrying out requested read, write, lock, or other operations locally.

The file distributor 90 hides from agents the complexities caused by the distributed nature of files. To the extent possible, the interface portion of the file distributor 90 resembles file system interfaces that are familiar in the art. An open file is denoted by a numeric fork_id and functions are provided to read, write, open, and otherwise manipulate and manage files and their contents.

However, a class in the schema 84 can be given a REPLICATED_FILE property. Whenever an object of such a class is created in the database, a distributed file is created by the file distributor 90 and file processor 92 to hold the file contents associated with that object. For instance, the Hierarchy Agent might create such an object to denote a leaf node in the directory hierarchy. In short, in one embodiment the file distributor 90 neither has nor needs an explicit externally called mechanism for creating files.

Moreover, the distributed file is deleted from storage when the corresponding object is deleted from the database. The locations at which the file is stored are precisely those at which the object exists. When a file with more than one replica 56 is modified and closed, the file distributors 90 and file processors 92 at the various locations holding the replicas 56 ensure that all replicas 56 of the file receive the new contents. It is not necessary for the agent to expressly manage any aspect of file content distribution.

A distributed file is identified by the UOID of the corresponding object; no built-in hierarchical naming scheme is used. A transaction identifier is also required when opening a file, to identify the session for which the file is to be opened. In one embodiment, the file distributor 90 and file processor 92 provide functionality according to the following interface:

```
//An ndr_fd_fork_id is the Id by which an FD open fork is known
typedef SINT16 ndr_fd_fork_id;
#define    NDR_FD_NOT_A_FORK_ID (-1)
//An ndr_fd_open_mode is a bit-mask which specifies whether a
//fork is open for reading and/or writing
typedef UINT16 ndr_fd_open_mode;
#define    NDR_FD_OPEN_READ_MODE          0x0001
#define    NDR_FD_OPEN_WRITE_MODE         0x0002
#define    NDR_FD_OPEN_EXCL_MODE          0x0004
#define    NDR_FD_OPEN_EXTERNAL_MODES     0x0007
//The remaining open modes are private to the replica managers
#define    NDR_FD_OPEN_SYNC_MODE          0x0008
#define    NDR_FD_OPEN_CLOSE_ON_EOF_      0x0010
           MODE
#define    NDR_FD_OPEN_READ_NOW           0x0020
```

In one alternative embodiment, opening a file with an NdrFdOpenFile( ) function returns pointers to two functions together with a separate fork_id for use with these two functions only. These pointers are of the type ndr_fd_io_ function, and may be used as alternatives to NdrFdReadFile( ) and NdrFdWriteFile( ) when accessing that open file only. The functions should be at least as efficient as NdrFdReadFile( ) and NdrFdWriteFile( ) and will be significantly faster when the file access is to a local location. Their use does require that the caller maintain a mapping from the open fork id onto these function pointers. For this reason, NdrFdReadFile( ) and NdrFdWriteFile( ) should always be available for all open files in this alternative embodiment:

```
typedef ndr_ret EXPORT (*ndr_fd_io_function)(
     ndr_fd_fork_id           fork_id,   /* —> Id of open fork
     UINT32                   offset,
     /* —> Offset at which to start reading */
     UINT16*                  length,
     /* <—> desired length on entry, actual length on
     exit. These will only differ if an error
     is encountered (such as end of file) */
     UINT8*                   data,
     /* <—> Data read or written */
     ndr_od_txn_id            txn_id);   /* —> txn_id
```

A "clash" occurs during synchronization when two desired changes to the database are inconsistent. Clashes arise from "independent" updates, namely, updates performed on separate replicas 56 while the computers holding the replicas 56 were disconnected. Thus, clashes always take place between a pair of "clashing updates" which together define a "clash condition." A "repairing update" is an update that removes a clash condition caused by a clashing update.

A "transient clash" is a clash that is not present in the final states of the two replicas 56 being merged. Transient clashes only arise when log-based or hybrid merging is used. For instance, suppose two users each create a file of a given name at two locations 36, 38 while those locations are disconnected. The user at the first location 36 then deletes (or renames or moves) the file in question before reconnection such that it no longer clashes with anything on the second location 38. On merging the replicas 56 of the two locations 36, 38, the original add update for the file from the first location 36 will clash with the replica 56 of the second location 38, yet the final result of applying the update stream from the first location 36 to the replica 56 on the second location 38 is a state that is compatible with that replica 56.

By contrast, "persistent clashes" create inconsistencies that are present in the final states of two replicas 56. A clash whose type is unknown is a "potential clash."

A "file contents clash" occurs when a file's contents have been independently modified on two computers 28, or when a file has been removed from one replica 56 and the file's contents have been independently modified on another replica 56.

An "incompatible manipulation clash" occurs when an object's attributes have been independently modified, when an object has been removed in one replica 56 and the object's attributes have been modified in another replica 56, when an object has been removed in one replica 56 and moved in the hierarchy in another replica 56, when a parent object such as a file directory has been removed in one replica 56 and has been given a child object in another replica 56, or when an object has been independently moved in different ways. Thus, although clashes are discussed here in connection with files and the file distributor 90, clashes are not limited to updates involving files.

A "unique key clash" occurs when two different objects are given the same key and both objects reside in a portion of the database in which that key should be unique. In a database representing a file system hierarchy, for instance, operations that add, move, or modify files or directories may create a file or directory in one replica 56 that clashes on reconnection with a different but identically-named file or directory in another replica 56.

A "permission clash" occurs when a change in file access or modification permissions that is made to a central server replica 56 would prohibit an independent update made to a mobile or client computer replica 56 from being applied to the server replica 56. A permission clash is an example of an "external clash," namely, a clash detected by reference to a structure external to the database. Permission clashes and other external clashes may be detected by trigger functions.

A "grouped attribute" is a database object attribute that is associated with other database object attributes such that changing the value of any attribute in a group creates a clash with the other attributes in the group. For instance, filename and rename-inhibit attributes are preferably grouped together, while filename and file-access-date attributes are preferably not grouped together. Without attribute grouping, a change to any attribute of an object is assumed to clash with a change to any other attribute of the object or another change to the same attribute.

"Eliminating a clash" means identifying the basis for the clash and eliminating it. "Recovering from a clash" means identifying the basis for the clash and either eliminating that basis or presenting alternative resolutions of the clash to a user to choose from. "Regressing an update" means undoing the update on at least one replica 56.

Creating a "recovery item" means moving an object into a recovery storage, creating a duplicate object in recovery storage, or adding a new object to recovery storage. In the case of duplicating an object, uses of the object's key may be remapped so that subsequent updates are performed on the recovery item instead of the original object. Suitable recovery storage means include directory hierarchies in a file system and container hierarchies in a directory services database. If the database represents a file system hierarchy, recovery items may be gathered in a "single directory hierarchy" or "recovery directory" that contains a directory at the root of the volume, recovered items, and copies of any directories necessary to connect the recovered items properly with the root.

A clash handler function of one of the types below can be registered with the file distributor 90 for a database type to be called whenever the file distributor 90 detects a clash caused by disconnected modification or removal of a file's contents. The parameters are those of a regular clash handler plus the object DOID with NDR_OS_CLASS_FLAG_HAS_PARTIALLY_REPLICATED_FILE property (the file object defined by the object schema 84) and possibly a duplicated object return:

```
//Call back to a husk in respect of clashes detected at the
//database level
typedef ndr_ret EXPORT (*ndr_fd_object_clash_fn) (
    ndr_od_db_handle       db,          /* —> Database */
    ndr_dodb_session_type  session,
    /* —> session to use in od_start_txn */
    ndr_od_clash_info*     info,
    /* —> Information on clash */
    ndr_dodb_doid_class*   old_doid,
    /* —> DOID of file with clashing contents */
    ndr_dodb_doid_class*   new_doid);
    /* <— Doid of duplicated
    file */
//Call back to the husk in respect of clashes detected at the
//filesystem level
//(via pre trigger functions)
typedef ndr_ret EXPORT (*ndr_fd_filesys_clash_fn) (
    ndr_od_db_handle       db,          /* —> Database */
    ndr_dodb_session_type  session,
    /* —> session to use in od_start_txn */
    ndr_od_clash_info*     info,
    /* —> Information on clash */
    ndr_dodb_doid_class*   doid);
    /* —> DOID of file with clashing contents */
```

A parameter block such as the following is passed to clash handling functions to provide them with information about the clash:

```
typedef struct
{
    ndr_dodb_ptid_type*        ptid;
    /* —> PTID of clashing txn */
    ndr_od_clash_type          clash_type;
    /* —> Clash type */
    ndr_os_class               class_id;
    /* —> Class id of object causing the
    clash */
    ndr_os_attribute           attr_id;
    /* —> Attr id of object causing the clash
    */
    ndr_dodb_update_list*      update_list;
    /* —> Update list of transaction */
    ndr_dodb_update*           update;
    /* —> Update causing clash (always a pointer
    into 'update_list' */
    BOOLEAN                    is_higher_priority;
    /* —> Relative priority of location
    to which update is being applied.
    TRUE=> Applying to location with higher
    priority (e.g. to location set with
    central location) */
    void*                      agent_merge_info;
    /* —> Value which is reserved for (arbitrary)
    use by agent clash handlers. It is
    guaranteed to be set to NULL on the
    first clash of a merge, and preserved
    for all subsequent clashes within that
    merge */
} ndr_od_clash_info;
```

A close handler function of type ndr_fd_close_fn can be registered with the file distributor 90 for a database type to be called whenever the file distributor 90 closes a modified local copy of the file contents, passing the new length and modification date/time and user identifier:

```
typedef ndr_ret EXPORT (*ndr_fd_close_fn) (
    ndr_od_db_handle       db,          /* —> Database */
    ndr_do_db_session_type session,
    /* —> session to use in od_start_txn */
    ndr_os_class           class_id,
    /* —> Class ID of file */
    ndr_dodb_uoid_type*    uoid,        /* —> UOID */
    UINT32                 length,
    /* —> length of closed file */
    UINT16                 time,
    /* —> modification time */
    UINT16                 date,
    /* —> modification date */
    UINT32                 updator);
    /* —> modification user */
```

A creation handler function of type ndr_fd_creation_fn can be registered with the file distributor 90 for a database type to be called whenever the file distributor 90 creates a local copy of the file contents. This allows the replica manager 46 on a central server computer 28 to update the master copy of the file to reflect the attributes of the file created while disconnected:

```
typedef ndr_ret EXPORT (*ndr_fd_creation_fn)(
    ndr_od_txn_id          txn_id,    /* —> txn_id */
    ndr_os_class           class_id,
    /* —> Class ID of file */
    ndr_dodb_uoid_type*    uoid);     /* —> UOID of file */
```

The file distributor 90 embodiment also provides the following:

```
//Return aggregated information about all volumes
ndr_ret EXPORT
NdrFdVolumeInfo(
    ndr_od_txn_id          txn_id,      /* —> txn_id */
    UINT32                 cluster_size,
    /* <— Number of bytes per cluster */
    UINT16*                total_clusters,
    /* <— Total number of clusters */
    UINT16*                free_clusters);
    /* <— Number of free clusters */
//Add a file
ndr_ret EXPORT
NdrFdAddFile(
    ndr_od_txn_id          txn_id,      /* —> txn_id */
    ndr_dodb_doid_class*   doid,
    /* —> Uoid of file created */
```

-continued

```
        UINT32                          length);
        /* --> Length of existing file (0 when new) */
//Remove a file
ndr_ret EXPORT
NdrFdRemoveFile(
        ndr_od_txn_id                   txn_id,         /* --> txn_id */
        ndr_dodb_uoid type*             uoid);
        /* --> Uoid of file removed */
//Open a file for reading or writing by a task
ndr_ret EXPORT
NdrFdOpenFile(
        ndr_od_txn_id                   txn_id,         /* --> txn_id */
        ndr_os_class                    class_id,
        /* --> Class ID of file to open */
        ndr_dodb_uoid_type              uoid,
        /* --> Uoid of file to open */
        ndr_fd_open_mode                open_mode,
        /* --> Open for read and/or write? */
        ndr_fd_fork_id*                 fork_id,
        /* <-- FD Fork Id of open file */
        BOOLEAN                         is_create,
        /* --> TRUE if open as part of create
        ndr_fd_io_function*             read_function,
        /* <-- Function to be used for READ operations */
        ndr_fd_io_function*             write_function,
        /* <-- Function to be used for WRITE operations */
        ndr_fd_fork_id*                 io_fork_id,
        /* <-- FD Fork Id used with above two functions (only) */
        UINT16*                         num_forks_remaining);
        /* <-- Number of forks remaining to be opened
            on same machine */
//Read from a file
ndr_ret EXPORT
NdrFdReadFile(
        ndr_od_txn_id                   txn_id,         /* --> txn_id */
        ndr_fd_fork_id                  fork_id,        /* --> Id of open fork */
        UINT32                          offset,
        /* --> Offset at which to start reading */
        UINT16                          req_length,
        /* --> Number of bytes requested to read */
        UINT8*                          data,           /* <-- Data read */
        UINT16*                         act_length);
        /* <-- Actual number of bytes read */
//Write to a file
ndr_ret EXPORT
NdrFdWriteFile(
        ndr_od_txn_id                   txn_id,         /* --> txn_id */
        ndr_fd_fork_id                  fork_id,        /* --> Id of open fork */
        UINT32                          offset,
        /* --> Offset at which to start writing */
        UINT16                          req_length,
        /* --> Number of bytes requested to write */
        UINT8*                          data);          /* --> Data to be written */
//Get the current length of an open file
ndr_ret EXPORT
NdrFdGetOpenFileLength(
        ndr_od_txn_id                   txn_id,         /* --> txn_id */
        ndr_fd_fork_id                  fork_id,        /* --> Id of open fork */
        UINT32*                         length);
        /* <-- Length of that open file */
//Lock or Unlock a range of bytes in an open file
ndr_ret EXPORT
NdrFdClearPhysicalRecord(or NdrFdLockPhysicalRecord(
        ndr_od_txn_id                   txn_id,         /* --> txn_id */
        ndr_fd_fork_id                  fork_id,        /* --> Id of open fork */
        UINT32                          offset,         /* --> Offset for lock */
        UINT32                          req_length);
        /* --> Number of bytes requested to lock */
//Ensure a file's contents are on disk
ndr_ret EXPORT
NdrFdCommitFile(
        ndr_od_txn_id                   txn_id,         /* --> txn_id */
        ndr_fd_fork_id                  fork_id);       /* --> Id of open fork
//Close a file, having completed reading and writing
ndr_ret EXPORT
NdrFdCloseFile(
        ndr_od_txn_id                   txn_id,         /* --> txn_id */
        ndr_fd_fork_id                  fork_id);       /* --> Id of open fork */
//Given a UOID to a file or directory return its name
//in the specified namespace, along with its parent's UOID
```

```
ndr_ret EXPORT
NdrFdGetFilename(
    ndr_od_db_handle              db,
    /* —> handle to current database */
    ndr_dodb_uoid_type*           file_or_dir_id,
    /* —> Uoid of object whose name is wanted */
    ndr_os_attr_property          namespace,
    /* —> Namespace (e.g. DOS) of
    name wanted */
    void*                         name_buffer,
    /* <— Buffer to receive name */
    UINT16*                       name_size,
    /* —> Size of provided buffer */
    ndr_dodb_uoid_type*           parent_dir_id);
    /* <— Parent UOID of object
    (NULL at root) */
//Callback functions to be used with
//NdrFdRegisterChangedIdCallback
typedef ndr_ret EXPORT
(*NdrFdChangedIdCallback)(
    ndr_od_db_handle              db,         /* —> Database Id */
    ndr_os_class                  class_id,
    /* —> Class ID of file or dir */
    ndr_dodb_uoid_type*           uoid,       /* —> Uoid of file or dir */
    UINT32                        new_id);
    /* —> New Id allocated by underlying file system */
```

A NdrFdRegisterChangedIdCallback( ) function provides registration of a callback function to be called when a change to a file or directory's unique identifier is made. On a NetWare 4.x server this normally happens only when the file or directory is created by an internal file distributor 90 trigger function. However the identifier will be needed by agents for tasks such as directory enumeration. Because trigger functions cannot directly modify replicated objects, a record of the identifier change is queued within the file distributor 90 and the callback is made asynchronously:

```
ndr_ret EXPORT
NdrFdRegisterChangedIdCallback(
    ndr_os_db_type_handle    db_type,    /* —> Database type */
    NdrFdChangedIdCallback   fn);        /* —> Callback function */
```

The interface also provides the following:

```
//Register clash handlers for contents clashes for files held
in
//a database of the given type.
ndr_ret EXPORT
NdrFdRegisterClashHandlers(
    ndr_os_db_type_handle    db_type,             // —> Database type
    ndr_os_class             class_id,
    // —> Class ID of contents 'container' eg file
    ndr_fd_object_clash_fn   object_clash_fn,
    // —> Clash handler for dealing with conflicts
    // —> between objects (e.g. contents modification
    // and removal)
    ndr_fd_filesys_clash_fn  filesys_clash_fn,
    // —> Clash handler for conflicts that arise
    // through some characteristic of the file
    // system (e.g. access rights on delete)
    ndr_fd_filesys_clash_fn  filesys_clash_fn1);
//Register a trigger-like routine to be called when a local
//replica of a file is modified. The routine takes the length
//and modification date/time of the local replica of the file.
ndr_ret EXPORT
NdrFdRegisterCloseHandler(
    ndr_os_db_type_handle    db_type,             // —> Database type
    ndr_os_class             class_id,
    /* —> Class ID of file */
    ndr_fd_close_fn          close_fn);
    /* —> Clash handler to call */
//Register a trigger-like routine to be called when a local
//replica of a file is has been created. This allows the
//replica manager on a central server to update the
//server's master copy of the file to reflect the attributes
```

```
//of the file created during the disconnection.
ndr_ret EXPORT
NdrFdRegisterCreationHandler(
       ndr_os_db_type_handle    db_type,        /* —> Database type */
       ndr_os_class             class_id,
       /* —> Class ID of file */
       ndr_fd_creation_fn       creation_fn);
       /* —> Creation handler to call */
//De-register a clash or close or creation handler for
//contents clashes for files held in a database of the given
type
ndr_ret EXPORT
NdrFdDeRegisterClashHandler(or CloseHandler(or
CreationHandler(
       ndr_os_db_type_handle    db type,        // —> Database type
       ndr_os_class             class_id);      // —> Class ID of file
//Synchronize all the files to and from this client for the
//passed database. Return control when the files are up to
date.
ndr_ret EXPORT
NdrFdSynchronizeFiles(ndr_od_db_handle db);
//Called from pre trigger functions to check whether
//or not the current connection has sufficient
//per-user-rights to perform a particular operation
//on a particular file system object.
ndr_ret
NdrFdCheckRights(
       ndr_dodb_uoid_type*      file_uoid,
       // uoid of object requiring rights to operation
       ndr_od_db_handle         db,
       // database raising the pre trigger
       UINT16                   operation);
       // bits representing operation
//Note that a file has been locally modified, setting
//modification info and triggering propagation onto other
//replicas.
ndr_ret EXPORT
NdrFdNoteFileModified(
       ndr_od_txn_id            txn_id,         /* —> txn_id */
       ndr_dodb_doid_class*     file_doid);
```

The trigger function registrations 94 identify trigger functions that are provided by agents and registered with the object distributor 82. A registered trigger function is called on each event when the associated event occurs. Suitable events include object modification events such as the addition, removal, movement, or modification of an object. Because the trigger functions are called on each location, they can be used to handle mechanisms such as file replication, where the file contents are not stored within the target database, while ensuring that the existence, content, and location of the file tracks the modifications to the target database. All objects must have been locked, either implicitly or via NdrOdLock( ), in the triggering transaction before the corresponding trigger function is called, and other objects may only be modified if the trigger function is being called for the first time at the location in question.

In an alternative embodiment, the replica manager 46 comprises a NetWare Loadable Module ("NLM") and an NWAdmin snap-in module. The NLM uses hooks in the NetWare file system 48 to intercept updates to the local NetWare storage 54, and uses standard NetWare file system Application Programmer's Interface ("API") calls to update the storage 54 when synchronizing. The architecture is symmetric, with the same code running on all computers 28.

The NLM has three major internal subsystems. An environment subsystem provides portability by separating the other two internal subsystems from the operating system environment such as the Windows NT or UNIX environment. The environment subsystem provides execution, debugging, scheduling, thread, and memory management services. A Distributed NetWare ("DNW") subsystem implements NetWare semantics by intercepting NetWare file system calls and calls from a DNW API and making corresponding requests of a dispatch layer discussed below. A distributed responder subsystem implements the replica manager 46 to provide a distributed disconnectable object database which supports replication, transaction synchronization, and schema-definable objects, including file objects, as described herein.

An application layer contains application programs and the NWAdmin snap-in. These programs interface with the replica manager 46 either by calling an API or by attempting to access the storage device 54 and being intercepted. An intercept layer in the replica manager 46 intercepts and routes external requests for file system updates that target a replica 56. A dispatch later receives the routed requests and dispatches them to an appropriate agent 44.

The agents 44, which have very little knowledge of the distributed nature of the database, invoke the consistency distributor 74, location distributor 78, object distributor 82, and/or file distributor 90. For example, a directory create would result in an object distributor 82 call to NdrOdAdd( ) to add a new object of type directory.

In contrast to the agents 44, the distributors 74, 78, 82, and 90 have little semantic knowledge of the data but know how it is distributed. The object distributor 82 uses the location distributor 78 to control multi-location operations such as replication and synchronization. The consistency distributor 74 manages transaction semantics, such as when it buffers updates made after a call to NdrOdStartTxn( ) and applies them atomically when NdrOdEndTxn( ) is called. The file distributor 90 manages the replication of file contents.

The processors 76, 86, 88, and 92 process requests for the local location 40. The consistency processor 76 handles transaction semantics and synchronization, and uses the transaction logger 88 to log updates to the database. The logged updates are used to synchronize other locations 40 and to provide recovery in the event of a clash or a crash. The logger 88 maintains a compressed transaction log. The log is "compressed," for example, in that multiple updates to the "last time modified" attribute of a file object will be represented by a single update. The logger 88 maintains a short sequential on-disk log of recent transactions; the longer-term log is held in the object database as update log entry objects.

The object processor 86 implements a local object store and supports the following access methods: hierarchical (e.g., add file object under directory object); global indexed (e.g., read any object using its UOID); and local indexed (e.g., read files and directories within a directory in name order). The object processor 86 uses a variant of a B*-tree. The object processor 86 uses a page table to support atomic commitment of transactional updates, providing rollback and protection against crashes of the computer 40.

A file system layer in the file system interface 48 provides a flat file system interface built on the local host file system. It re-maps the flat file system calls to the corresponding files in the hierarchical NetWare volumes to support the current NetWare file system.

Figure 4:
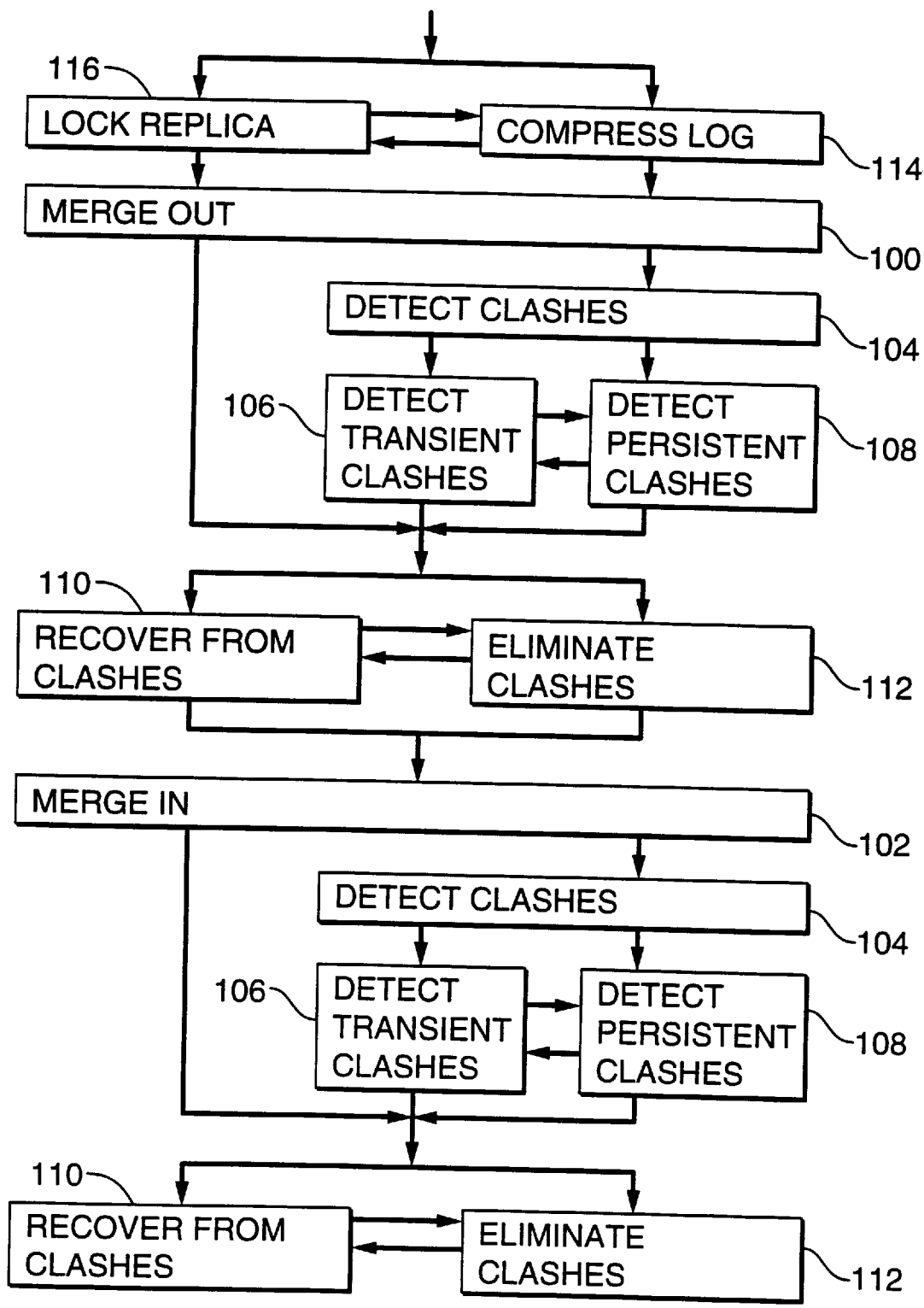
FIG. 4 is a flowchart illustrating clash handling methods of the present invention.

With reference to FIGS. 1 through 4 and particular focus on FIG. 4, a method of the present invention is illustrated for handling clashes during the synchronization of operations performed on the disconnected first computer 36 with operations performed on the second computer 38. As discussed, each of the computers 36, 38 contains a replica 56 and the synchronization of replicas 56 is performed after the first computer 36 and the second computer 38 are reconnected by the network link 52.

During a merging out step 100 a representation of operations performed on the first computer 36 is transferred to the second computer 38 and applied to the replica 56 on the second computer. The representation may include operation and object-identifying information from an update log, a transaction sequence number, and a location identifier corresponding to the first computer 36. For purposes of illustrating the method, the first computer 36 shown in FIG. 1 is a client computer 20 and the second computer 38 is a server computer 16. However, a server and a client, or two servers, or two clients, may also be synchronized and otherwise managed according to the present invention.

The merging out step 100 may be accomplished in accordance with a SyncUpdate request, with the respective consistency distributors 74 of the computers 36, 38, and with the object processor 86, transaction processor 88, file system interface 48, and storage device and controller 54 of the second computer 38. If the contents of a distributed file have been modified, the file distributors 90 on the two computers 36, 38 are also utilized.

A merging in step 102 is performed in a manner similar to the merging out step 100, but in the opposite direction. That is, the merging in step 102 transfers a representation of operations performed on the second computer 38 to the first computer 36 and applies the operations to the replica 56 on the first computer 36.

One or both of the merging steps 100, 102 includes a clash detecting step 104. The clash detecting step 104 may in turn include a transient clash detecting step 106, a persistent clash detecting step 108, or both.

In one embodiment, the clash detecting step 104 determines whether a clash is transient or persistent by scanning forward through the update stream to determine if a subsequent update will remove the clash condition. If such a repairing update exists, then the clash is transient; otherwise, it is persistent.

In an alternative embodiment, the clash detecting step 104 determines whether a clash is transient or persistent by consulting the replica 56 on the source location 36 to determine the final state of the object or other item being updated, consulting the replica 56 on the target location 38, and determining whether the two final states are consistent. If they are, then the clash is transient; otherwise, it is persistent. If the clash is transient the object that clashed may be locked on the second location 38 during merging to prevent changes that would create a persistent clash.

In either embodiment, if the clash is transient then the clash detecting step 104 includes the transient clash detecting step 106. Likewise, if the clash is persistent then the clash detecting step 104 includes the persistent clash detecting step 108.

A recovering step 110 recovers from at least a portion of the detected clashes, while an eliminating step 112 eliminates at least a portion of the detected clashes. The recovering step 110 may involve user intervention, automatic "transparent" recovery or regression, or automatic "transparent" elimination of clashes. The eliminating step 112 involves only automatic "transparent" elimination of clashes. The detecting step 104, recovering step 110, and the regressing steps discussed below are preferably applied recursively after an update regression to handle clashes caused by the update regression.

In one embodiment, the eliminating step 112 removes transient clashes by "patching up" the transaction stream in a way that removes the clash condition but does not change the final state of the replica 56 to which the stream is being applied. This can be done by scanning forward from the clashing update in the log of the first computer 36 until a repairing update is found. The original clashing update is then removed and the repairing update is modified to combine its effects with those of the removed update.

As an example consider the case in which a file is created with clashing name A and then renamed to non-clashing name B before reconnection. The original add update is removed and the rename update is replaced by an update that adds B. The end result of applying the patched update stream to the replica 56 must be the same as the result without patching. In particular, the patched updates must receive the same PTID values as they would have without patching; this may require explicit modification of PTIDs.

Patching may also insert an update prior to the clashing update. For instance, the handling of several clashes discussed below includes the creation of a recovery directory. The recovery directory creation is inserted prior to the clashing update. In some cases, the clashing update is then modified to place the clashing object in the recovery directory. In other cases, another update is inserted after the recovery directory creation but before the clashing update to move the clashing object into the recovery directory.

In another embodiment, the eliminating step 112 removes transient clashes by applying the entire update stream to a shadow replica 56 and then "unshadowing" at the end by copying from the shadow replica 56 to the regular replica 56. If the application of updates to the shadow replica 56 is interrupted, the modified shadow replica 56 is discarded and the entire stream is applied again.

The recovering step 110, the eliminating step 112, and the clash detecting step 104 may utilize semantic information embedded in one or more of the agents 44. For instance, in one embodiment the hierarchy agent 44 and replica manager 46 detect the clash conditions listed below and handle them as indicated.

In general, clash conditions are detected by examining requested updates. The updates may be updates operating on objects, on attribute groups, or on other items having associated PTIDs. Each PTID associated with an item uniquely labels a particular set of item values generated by a particular transaction. When a transaction is initially executed, the executing transaction's PTID is used to label the affected item(s). Also, at initial transaction execution time the "pre-update PTIDs" of the items are noted; these are the items' PTID values immediately prior to execution at the location 36 where the transaction is being initially executed.

When transaction execution is attempted at the second location 38, clashes are detected as follows. If an item has been updated at the second location 38 by an update not seen at the first location 36 then the item's local (to the second location 38) PTID values will differ from the pre-update PTIDs associated with the transaction. In this manner various "modify-modify clashes" are detected. Variations on the modify-modify PTID comparison are also used to detect other types of clashes, as explained below.

During a "remove-modify clash" the remove transaction is being applied. This clash is detected in the same manner as modify-modify clashes with the different clash type reported because it is a modify update.

In a "modify-remove clash" the item whose PTIDs are being checked against the transaction's pre-update PTIDs does not exist on the second location 38; this is detected during the attempt to check pre-update PTIDs.

To detect a "modify-move clash" a pseudo-attribute group associated with an object's parent is used, allowing this case to be treated as a modify-modify applied to the pseudo-attribute group.

Other clashes, such as various "key clashes" and "removed parent/added child clashes" are detected when applying the transaction to the replica 56 at the second location 38 without requiring comparison of PTIDs. A "removed parent clash" is detected on the attempt to add or move in the replica 56 on the second location 38. A "remove-added child clash" is detected when the removal is attempted on the replica 56 on the second location 38, because it is an error to remove an object that has children.

Once detected, various clashes are handled as follows. A "contents independent modify clash" occurs when a file's contents have been independently modified on the source 36 and target 38 locations. During clash handling, a recovery directory is created using NdrOdAdd( ). The file object and its contents are duplicated in the recovery directory, generating new UOIDs for the file object and its content object, and the update is applied to the target replica 56.

A "contents removed clash" occurs when a file's contents have been removed on the target 38 location and independently modified on the source 36 location. A recovery directory is created using NdrOdAdd( ). The file object and its contents are duplicated in the recovery directory, generating new UOIDs for the file object and its content object, and the update is applied to the target replica 56. This clash is detected during the merging out step 100 and the original object is removed during the merging in step 102.

A "contents remove modified clash" occurs when a file's contents have been modified on the target 38 location and independently removed on the source 36 location. The update is regressed; the object is not removed.

As noted above, a unique key clash occurs when two different objects are given the same key and both objects reside in a portion of the database in which that key should be unique. In particular, a "file or directory unique key clash" occurs when two different files or directories with the same parent have the same value for a unique sibling key, or when different files or directories have the same value for a unique global key.

If one of the clashing updates is an add or a move, then a recovery directory is created using NdrOdAdd( ). The creation (for add) or destination (for move) parent UOID in the update is changed to the recovery directory, the local object processor 86 copy of the object is moved to the recovery directory, and the update is applied to the target replica 56. If the clashing update is a modify, a recovery directory is created, the modified object is moved into that recovery directory using NdrOdMove( ), and the update is applied to the target replica 56.

A "file or directory independent modify clash" occurs when a given file or directory has had two or more attributes in a single attribute group independently modified. The update is regressed; the object is not modified a second time.

A "file or directory removed clash" occurs when a file or directory has been removed on the target 38 location and has independently had attributes modified, been moved, or been removed on the source 36 location. The update is regressed; the object is not moved or modified or removed, because it no longer exists.

A "file or directory remove modified clash" occurs when a file or directory has modified attributes or has been moved on the target 38 location and has independently been removed on the source location 36. The update is applied only if a Delete Inhibit flag is not set; otherwise, the update is regressed.

A "file or directory remove non-empty clash" occurs when a directory has had child objects added or moved into it on the target 38 location and has independently been removed on the source 36 location. The update is regressed; the object is not removed. This should never happen for files if regressing the removal of the child contents object regresses the removal of all ancestor objects from the log; otherwise, the update should be regressed.

A "file or directory removed parent clash" occurs when a file or directory has been moved or added on the source 36 location and its parent has been independently removed on the target 38 location. A recovery directory is created using NdrOdAdd( ). The creation (for add) or destination (for move) parent UOID in the update is changed to the recovery directory, the local object processor 86 copy is moved to the recovery directory, and the update is applied to the target replica 56.

A "file or directory move clash" occurs when a file or directory has been independently moved to two different parents. A recovery directory is created using NdrOddd( ). The destination parent UOID in the update is changed to the recovery directory, the local object processor 86 copy is moved to the recovery directory, and the update is applied to the target replica 56. This moves the file into the recovery directory. During the merging in step 102 the clashing move update can be executed to move the file into the correct place as long as the "old parent" is ignored in processing the move update.

This is a "transient recovery" to avoid subsequent transient clashes. If the move update were regressed until the merging in step 102 performed the successful move of the second computer 38, there might be subsequent name clashes with files moved or added in later updates in the log of the first computer 36.

To support clash handling, the agents 44 and the replica manager 46 provide the following mechanisms. One mechanism logically groups all clashes from one merge (comprising steps 100–116), providing a merge identifier passed as a parameter to the clash handler routine in the agent 44. In one embodiment, the "agent_merge_info" field of the ndr_od_clash_info structure passed to all clash handlers is NULL on the first clash of a merge and is preserved for all subsequent clashes of the same merge.

Another mechanism reads the current attributes of an object in either the source location 36 or the target location 38. In one embodiment, the NdrOdRead( ) and NdrCdClashReadHistorical( ) functions perform this, and the transaction is re-targeted to the target location 38 using NdrCdTargetMergeSet( ).

Another mechanism duplicates an object and all descendent objects recursively; in practice the recursion is typically not very deep. The mechanism also allocates new UOIDs for the duplicates. In an alternative embodiment all references in the merge update stream to the UOIDs of the duplicated objects are remapped to use the duplicate UOIDs instead, but in one current embodiment of the hierarchy agent 44 no such remapping has been needed. This mechanism also provides a call-back function so that the hierarchy agent 44 can allocate new globally unique identifiers where necessary. In the current embodiment, the function NdrCdClashDuplicateObject( ) performs the duplication. The "call-back" function for allocating new globally unique identifiers is registered against the attribute type via the "init_function" parameter of NdrosRegisterKeyingFunctions( ).

Another mechanism undoes the local database replica 56 effect of a regressed update, either using inversion information in the update or by reading the target object. The latter approach will have temporal consistency problems, so using inversion information in the update is preferred. The object must be re-created, with its original UOID and with the necessary ancestral context, in the source location 36 consistency processor 76/object processor 86. This re-creation need not, but could, go through all the normal trigger mechanisms so as to cause the file distributor 90 to schedule the re-propagation of any file contents, since the merging in step 102 will contain a file contents modification update from the target location 38. In one embodiment, NdrCdClashRemoveTransaction( ) performs all these actions for all the updates for the current clash transaction, and there is no other mechanism for undoing the effect of an update.

Another mechanism allows the system, when undoing the local database replica 56 effect of a regressed update, to recreate any necessary ancestor objects which may also have been removed. At the same time subsequent updates in the merging out 100 update stream which remove parent objects are also regressed. In one embodiment, this is done by NdrCdClashRemoveTransaction( ).

Another mechanism modifies UOIDs for the parent of an addition or the destination parent of a move in the clashing update. This is preferably provided as an explicit API rather than implicitly modifying the UOID within the update. In one embodiment, this is done by NdrCdClashRemapUpdateTarget( ).

Another mechanism moves an object within the local object processor 86 without generating any update transactions. This may be combined with the above UOID modification into a single object distributor 82/consistency distributor 74 operation. In one embodiment, this is done by NdrCdClashRemapUpdateTarget( ).

Another mechanism executes a limited set of updates on the source 36, such that these updates effectively occur before (or within) the clashing transaction and are propagated to other locations in this sequence. The updates required are limited to add and move operations, and can be guaranteed by the clash handler never to fail due to consequential clashes with objects created outside of the current merge. In one embodiment, the normal update operations such as NdrOdAdd( ), NdrOdModify( ), NdrOdMove( ) and NdrOdRemove( ) perform update insertion rather than appending to the end of the transaction stream when the transaction has been started with NdrOdStartClashTxn( ) instead of NdrOdStartTxn( ).

Another mechanism executes a limited set of updates on the target 38. The updates required are limited to add and move operations. The target 38 will be a client machine 20, not the central server 16. The updates should be executed normally, appearing at the end of the client's log. In one embodiment, the normal update operations such as NdrOdAdd( ), NdrOdModify( ), NdrOdMove( ) and NdrOdRemove( ) act accordingly on the target location 38 if NdrCdTargetMergeSet( ) has been called for the current transaction.

One method of the present invention also includes a compressing step 114 which compresses at least one of the update logs on the computers 36, 38 whose replicas 56 are being merged. An instance of the compressing step 114 may precede either or both of the merging steps 100, 102. Compression can be accomplished by log patching, as described above, or by other steps. Compression reduces the time needed for merging by reducing the number of updates to be applied to the replicas 56. In addition, compression may detect and eliminate transient clashes, so instances of the detecting step 106 and the eliminating step 112 may occur during the compressing step 114.

Either or both of the merging steps 100, 102, may be preceded by a locking step 116 which locks the replica 56 during merging to prevent access to the replica 56 by any process other than a process that is performing the merging step 100 and/or 102. Locking is accomplished using semaphores or other means familiar in the art.

In summary, the present invention provides a system and method for detecting and handling inconsistent changes to copied items when two disconnectable computers are reconnected. A wide variety of persistent and transient clashes are detected and handled log patching, regression, and other means. The present invention is not limited to file system operations but can instead be extended to support a variety of database objects using the object schema, distributors, processors, and other inventive components described herein.

Although particular methods embodying the present invention are expressly illustrated and described herein, it will be appreciated that apparatus and article embodiments may be formed according to methods of the present invention. Unless otherwise expressly indicated, the description herein of methods of the present invention therefore extends to corresponding apparatus and articles, and the description of apparatus and articles of the present invention extends likewise to corresponding methods.

The invention may be embodied in other specific forms without departing from its essential characteristics. The described embodiments are to be considered in all respects only as illustrative and not restrictive. Any explanations provided herein of the scientific principles employed in the present invention are illustrative only. The scope of the invention is, therefore, indicated by the appended claims rather than by the foregoing description. All changes which come within the meaning and range of equivalency of the claims are to be embraced within their scope.

What is claimed and desired to be secured by patent is:

1. A method for handling clashes during the synchronization of operations performed on a disconnected first computer with operations performed on a second computer, the synchronization being performed after the first computer and the second computer are reconnected by a network link, the second computer and the first computer each containing a replica of a distributed database, said method comprising the computer-implemented steps of:

merging out a representation of the operations performed on the first computer by applying at least a portion of the operations to the second replica;

merging in a representation of the operations performed on the second computer by applying at least a portion of the operations to the first computer replica;

detecting persistent clashes during at least one of said merging steps; and recovering from at least a portion of the detected persistent clashes.

2. The method of claim 1, wherein the representation of the operations performed on each computer includes an update log.

3. The method of claim 2, wherein said method further comprises the steps of detecting transient clashes and eliminating at least a portion of the detected transient clashes.

4. The method of claim 3, wherein said method further comprises the step of compressing at least one of the update logs and said steps of detecting and eliminating transient clashes both occur during said compressing step.

5. The method of claim 3, wherein said step of detecting transient clashes comprises identifying a clashing update in an update log, and said eliminating step comprises scanning forward in the log from the clashing update to determine whether a subsequent repairing update will remove a clash condition associated with the clashing update.

6. The method of claim 5, wherein temporally consistent sections of the update log are merged atomically.

7. The method of claim 3, wherein said eliminating step comprises providing a shadow database for at least a portion of one of the replicas, and one of said merging steps applies operations atomically to the shadow database and subsequently alters the replica to correspond with the shadow database.

8. The method of claim 1, wherein one of said merging steps is preceded by the step of locking the replica used during merging to prevent access to the replica during merging by any process other than a process that is performing the merging step.

9. The method of claim 1, wherein said steps of detecting persistent clashes and recovering from persistent clashes are performed primarily on the second computer.

10. The method of claim 1, wherein said merging out step is preceded by the step of compressing an update log on the first computer to create the representation of operations performed on the first computer.

11. The method of claim 1, wherein said step of detecting persistent clashes comprises detecting unique key clashes.

12. The method of claim 1, wherein said step of detecting persistent clashes comprises detecting incompatible manipulation clashes.

13. The method of claim 1, wherein said step of detecting persistent clashes comprises detecting file content clashes.

14. The method of claim 1, wherein said step of detecting persistent clashes comprises detecting permission clashes.

15. The method of claim 1, wherein said step of detecting persistent clashes comprises detecting a clash between at least a portion of the distributed database and a structure external to the distributed database.

16. The method of claim 1, wherein said step of recovering from persistent clashes comprises comparing a value in the first computer replica with a corresponding value in the second replica and modifying the value stored in one replica to make it equal to the corresponding value in the other replica.

17. The method of claim 1, wherein the representation of the operations performed on the first computer includes an update log, and said step of recovering from persistent clashes comprises regressing persistently clashing updates from the first computer replica.

18. The method of claim 17, wherein said detecting, recovering, and regressing steps are applied recursively after an update regression to handle clashes caused by the update regression.

19. The method of claim 1, wherein said step of recovering from persistent clashes comprises inserting an update into the update stream before a clashing update.

20. The method of claim 1, wherein said step of recovering from persistent clashes comprises creating a recovery item in a recovery storage.

21. The method of claim 20, wherein the recovery storage comprises a directory hierarchy for holding recovery items in a file system.

22. The method of claim 21, wherein all recovery items created in response to clashes detected during a single instance of said detecting step reside in a single directory hierarchy whose directories were created during said recovering step.

23. The method of claim 20, wherein the recovery storage comprises a container hierarchy for holding recovery items in a directory services tree.

24. The method of claim 20, wherein said step of creating a recovery item comprises moving an object in the distributed database into the recovery storage.

25. The method of claim 20, wherein said step of creating a recovery item comprises duplicating an object in the distributed database and placing the duplicate object into the recovery storage.

26. The method of claim 20, wherein said step of creating a recovery item comprises creating in the recovery storage an object that is not present in the distributed database.

27. The method of claim 1, wherein at least one of said merging steps includes applying an operation to the replica by modifying a grouped attribute.

28. The method of claim 1, further comprising the steps of:

associating a sequence number with each operation performed on the first computer while the first computer is disconnected from the second computer; and maintaining a record on the second computer of which sequence numbers have been applied to the second replica during said merging out step.

29. The method of claim 1, wherein the first computer is a mobile computer and the second computer is a central server computer.

30. The method of claim 1, wherein the first computer and the second computer are each server computers in a computer network.

31. A computer-readable storage medium having a configuration that represents data and instructions which cause a first computer and a second computer connected by a network link to perform method steps for handling clashes, the first computer and the second computer each containing a replica of a distributed database, the method comprising the steps of:

merging out a representation of operations performed on the first computer by applying at least a portion of the operations to the second replica;

merging in a representation of operations performed on the second computer by applying at least a portion of the operations to the first computer replica;

detecting persistent clashes during at least one of the merging steps; and recovering from at least a portion of the detected persistent clashes.

32. The storage medium of claim 31, wherein the representation of the operations performed on each computer includes an update log and the method further comprises the steps of detecting transient clashes and eliminating at least a portion of the detected transient clashes.

33. The storage medium of claim 32, wherein the method further comprises the step of compressing at least one of the update logs and the steps of detecting and eliminating transient clashes both occur during the compressing step.

34. The storage medium of claim 32, wherein the step of detecting transient clashes comprises identifying a clashing update in an update log, and the eliminating step comprises scanning forward in the log from the clashing update to determine whether a subsequent repairing update will remove a clash condition associated with the clashing update.

35. The storage medium of claim 31, wherein the merging out step is preceded by the step of compressing an update log on the first computer to create the representation of operations performed on the first computer.

36. The storage medium of claim 31, wherein the step of detecting persistent clashes comprises detecting incompatible manipulation clashes.

37. The storage medium of claim 31, wherein the step of detecting persistent clashes comprises detecting file content clashes.

38. The storage medium of claim 31, wherein the step of detecting persistent clashes comprises detecting a clash between at least a portion of the distributed database and a structure external to the distributed database.

39. The storage medium of claim 31, wherein the representation of the operations performed on the first computer includes an update log, and the step of recovering from persistent clashes comprises regressing persistently clashing updates from the first computer replica.

40. The storage medium of claim 31, wherein the step of recovering from persistent clashes comprises inserting an update into the update stream.

41. The storage medium of claim 31, further comprising the steps of:

associating a sequence number with each operation performed on the first computer while the first computer is disconnected from the second computer; and maintaining a record on the second computer of which sequence numbers have been applied to the second replica during the merging out step.

42. A system for clash handling comprising:

a first computer;

a second computer connected to the first computer by a network link, the first computer and the second computer each containing a replica of a distributed database;

means for merging out a representation of operations performed on the first computer and applying at least a portion of the operations to the second replica;

means for merging in a representation of operations performed on the second computer and applying at least a portion of the operations to the first computer replica;

means for detecting persistent clashes during at least one of the merging steps; and means for recovering from at least a portion of the detected persistent clashes.

43. The system of claim 42, wherein the representation of the operations performed on each computer includes an update log and said system further comprises means for detecting transient clashes and means for eliminating at least a portion of the detected transient clashes.

44. The system of claim 43, wherein said system further comprises means for compressing at least one of the update logs.

45. The system of claim 43, wherein said means for detecting transient clashes comprises means for identifying a clashing update in an update log, and said means for eliminating transient clashes comprises means for scanning forward in the log from the clashing update and means for determining whether a subsequent repairing update will remove a clash condition associated with the clashing update.

46. The system of claim 42, wherein said means for detecting persistent clashes comprises means for detecting incompatible manipulation clashes.

47. The system of claim 42, wherein said means for detecting persistent clashes comprises means for detecting file content clashes.

48. The system of claim 42, wherein said means for detecting persistent clashes comprises means for detecting a clash between at least a portion of the distributed database and a structure external to the distributed database.

49. The system of claim 42, wherein the representation of the operations performed on the first computer includes an update log, and said means for recovering from persistent clashes comprises means for regressing persistently clashing updates from the first computer replica.

50. The system of claim 42, wherein said means for recovering from persistent clashes comprises means for inserting an update into the update stream.

51. The system of claim 42, further comprising:

means for associating a sequence number with each operation performed on the first computer while the first computer is disconnected from the second computer; and means for maintaining a record on the second computer of which sequence numbers have been applied to the second replica during the merging out step.

* * * * *